US012708807B2

(12) United States Patent
Feenstra et al.

(10) Patent No.: US 12,708,807 B2
(45) Date of Patent: Aug. 18, 2026

(54) HIGH-EXPANSION FOAM GENERATOR

(71) Applicant: Minimax Viking Patent Management GmbH, Bad Oldesloe (DE)

(72) Inventors: Shawn J. Feenstra, Caledonia, MI (US); Marc S. Ferere, Grand Rapids, MI (US); Derek J. Scheffers, Mattawan, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 0 days.

(21) Appl. No.: 17/963,744

(22) Filed: Oct. 11, 2022

(65) Prior Publication Data

US 2023/0081536 A1 Mar. 16, 2023

Related U.S. Application Data

(63) Continuation of application No. PCT/US2021/027094, filed on Apr. 13, 2021, and a
(Continued)

(51) Int. Cl.
*A62C 5/02* (2006.01)
*A62C 31/12* (2006.01)
*B05B 7/00* (2006.01)

(52) U.S. Cl.
CPC .............. *A62C 5/024* (2013.01); *A62C 31/12* (2013.01); *B05B 7/005* (2013.01)

(58) Field of Classification Search
CPC .......... A62C 5/024; A62C 31/12; B05B 7/005
(Continued)

(56) References Cited

U.S. PATENT DOCUMENTS 2,542,014 A 2/1951 Edwards et al.
2,597,913 A 5/1952 Webster
(Continued)

FOREIGN PATENT DOCUMENTS

CN 201049165 Y 4/2008
CN 101380507 A 3/2009
(Continued)

OTHER PUBLICATIONS

RU2494779 English by Google (Year: 2012).*
(Continued)

*Primary Examiner* — Chee-Chong Lee
(74) *Attorney, Agent, or Firm* — Perkins Coie LLP

(57) ABSTRACT

An apparatus and method directed to aspirated-type high-expansion foam generation having a nozzle manifold configured to receive a foam solution and at least one nozzle assembly. The generator includes a foam generator assembly disposed adjacent the nozzle manifold. The foam generator has a body portion having a first foam generating portion and a second foam generating portion that is connected to the first foam generating portion. The generator is configured with a main header of the nozzle manifold disposed orthogonal to at least one sub-header; less than six nozzle assemblies; a ratio of a diameter of an inlet of a respective nozzle to a distance from an inner wall surface of the header to the inlet of the respective nozzle is 0.8 or less; and a nozzle with a nozzle insert with a crossover path defined by a non-sharp transition member and a cone shaped tip.

33 Claims, 10 Drawing Sheets

Related U.S. Application Data continuation of application No. PCT/US2021/027065, filed on Apr. 13, 2021, and a continuation of application No. PCT/US2021/027087, filed on Apr. 13, 2021, and a continuation of application No. PCT/US2021/027082, filed on Apr. 13, 2021, and a continuation of application No. PCT/US2021/027101, filed on Apr. 13, 2021.

(60) Provisional application No. 63/009,801, filed on Apr. 14, 2020, provisional application No. 63/009,847, filed on Apr. 14, 2020, provisional application No. 63/009,812, filed on Apr. 14, 2020, provisional application No. 63/009,775, filed on Apr. 14, 2020, provisional application No. 63/009,784, filed on Apr. 14, 2020.

(58) Field of Classification Search
USPC .............................................................. 239/8
See application file for complete search history.

(56) References Cited

U.S. PATENT DOCUMENTS

| | | | | | |
|---|---|---|---|---|---|
| 3,428,131 | A | | 2/1969 | Winslow | |
| 3,724,762 | A | * | 4/1973 | Freshour | B01F 25/3121 239/427.3 |
| 3,836,076 | A | * | 9/1974 | Conrad | A01G 13/065 239/431 |
| 3,853,784 | A | * | 12/1974 | Rogers | B05B 7/30 239/311 |
| 3,918,647 | A | * | 11/1975 | Lamz | B29B 7/7419 239/432 |
| 3,946,947 | A | * | 3/1976 | Schneider | A62C 5/002 239/311 |
| 3,961,754 | A | * | 6/1976 | Kuhns | B05B 7/0425 239/311 |
| 4,044,954 | A | * | 8/1977 | Campbell | B05B 1/12 411/929 |
| 4,805,700 | A | * | 2/1989 | Hoover | A62C 31/12 261/DIG. 2 |
| 5,623,995 | A | * | 4/1997 | Smagac | B01F 25/43161 169/30 |
| 5,848,752 | A | | 12/1998 | Kolacz et al. | |
| 7,975,773 | B2 | | 7/2011 | Murata et al. | |
| 8,322,633 | B2 | | 12/2012 | Hubert et al. | |
| 8,720,592 | B2 | | 5/2014 | Hubert et al. | |
| 2005/0263297 | A1 | | 12/2005 | Dimarzo et al. | |
| 2009/0266564 | A1 | | 10/2009 | Murata | |

FOREIGN PATENT DOCUMENTS

| | | | |
|---|---|---|---|
| CN | 102974059 | A | 3/2013 |
| CN | 103550890 | A | 2/2014 |
| CN | 206252756 | U | 6/2017 |
| CN | 109701189 | A | 5/2019 |
| CN | 210145352 | U | 3/2020 |
| CN | 210145353 | U | 3/2020 |
| JP | 63-156658 | | 10/1988 |
| JP | H04102467 | A | 11/1999 |
| JP | 2009213569 | A | 9/2009 |
| JP | 2009240567 | A | 10/2009 |
| JP | 2011147483 | A | 8/2011 |
| JP | 2019076438 | A | 5/2019 |
| KR | 100807170 | B1 | 2/2008 |
| KR | 10-0917277 | | 9/2009 |
| KR | 20130030855 | A | 3/2013 |
| RU | 2494779 | C1 | 10/2013 |
| WO | WO 2017/016143 | A1 | 2/2017 |

OTHER PUBLICATIONS

CN102974059A Google Patents English (Year: 2012).*

International Searching Authority, International Search Report in International Appln. No. PCT/US2021/027101, Aug. 4, 2021, 3 pp.

International Searching Authority, Written Opinion in International Appln. No. PCT/US2021/027101, Aug. 4, 2021, 6 pp.

Viking S.A. Product Sheet/Foam Products GH250 & GH400 High Expansion Generator. PS1.3.4.18/12122018-01162020, 1 page.

International Searching Authority, International Search Report and Written Opinion in International Appln. No. PCT/US2021/027065, Jul. 6, 2021, 13 pp.

International Searching Authority, International Search Report in International Appln. No. PCT/US2021/027082, Aug. 6, 2021, 15 pp.

International Searching Authority, International Search Report and Written Opinion in International Appln. No. PCT/US2021/027087, Aug. 6, 2021, 11 pp.

International Searching Authority, International Search Report in International Appln. No. PCT/US2021/027094, Sep. 23, 2021, 24 pp.

Johnson Controls/Ansul Ansul® Jet-X High-Expansion Foam Generators Datasheet, Form No. F-93137-11, 2018, 6 pp.

Tyco Fire Products, Skum HG High Expansion Foam Generators Datasheet, 2018, 2 pp.

Leader, Alpha Generator HF+ 400 High Expansion Foam Generator Datasheet, R12, date unknown, 2 pp.

The Viking Corporation, Technical Data, Water Powered High Expansion Foam Generators, Foam 150a, Form No. F_011005, Jun. 1, 2010 (Revised page replaces p. 150a-d dated Jun. 1, 2008.), 10 pp.

The Viking Corporation, Technical Data, High Expansion Foam System, Foam 50a, Form No. F_011205, Dec. 6, 2010 (Revised page replaces page Foam 50a-k, dated Jun. 1, 2008), 12 pp.

European Patent Office (Espacenet), English translation of Chinese Publication No. CN210145352U (Shanghai Huarui Rescue Equipment Co Ltd; Inventor Yang, Feng.); Apr. 24, 2023, 7 pp.

* cited by examiner

HIGH-EXPANSION FOAM GENERATOR

PRIORITY CLAIM & INCORPORATION BY REFERENCE

This patent application is a continuation application of, and claims the benefits and priority to, International Application No. PCT/US2021/027065, filed Apr. 13, 2021, which claims the benefit of U.S. Provisional Application No. 63/009,775 filed Apr. 14, 2020; International Application No. PCT/US2021/027082, filed Apr. 13, 2021, which claims the benefit of U.S. Provisional Application No. 63/009,784 filed Apr. 14, 2020; International Application No. PCT/US2021/027087, filed Apr. 13, 2021, which claims the benefit of U.S. Provisional Application No. 63/009,801 filed Apr. 14, 2020; International Application No. PCT/US2021/027094, filed Apr. 13, 2021, which claims the benefit of U.S. Provisional Application No. 63/009,812 filed Apr. 14, 2020; and International Application No. PCT/US2021/027101, filed Apr. 13, 2021, which claims the benefit of U.S. Provisional Application No. 63/009,847 filed Apr. 14, 2020, all of which applications are incorporated by reference in their entirety.

TECHNICAL FIELD

The present disclosure relates to fire extinguishing systems, and more particularly, to high-expansion foam generators used in fire suppression systems.

BACKGROUND ART

Fire suppression systems in large enclosed areas can include high expansion foam systems to protect an enclosed area that quickly cover and/or fill the area with a foam solution, which is a mixture of a foam concentrate and a fire suppression fluid (e.g., water). In such systems, high expansion foams (e.g., foams having an expansion ratio of 200:1 to approximately 1000:1) may be more efficient in terms of cost and/or equipment than conventional sprinkler systems or foam systems with lower foam expansion ratios. The high expansion systems can include high expansion generators that are usually part of a fixed deluge or flow control system. The high expansion foam (HEF) generators are typically used in combination with a foam proportioning system that mixes a foam concentrate and fluid (e.g., water) to provide a foam solution at the proper concentrate to the nozzles of the foam generators. The nozzles spray the foam solution into the foam generator such that foam solution jet streams impinge on a portion of the foam generator having a plurality of openings. As the foam solution passes through the openings, the foam solution entraps air forming bubbles which create the firefighting foam. The firefighting foam is discharged into the enclosure to suppress the fire.

HEF generators can include fan-type generators, which force air through the foam generator assembly as the foam is generated, and aspirated-type foam generators, which draw air into the foam generator assembly due to a differential pressure between the surrounding atmosphere and the lower pressure in the foam generator. The lower pressure in the aspirated-type foam generator is created by the foam solution jet streams as they discharge from the nozzles. Thus, in aspirated-type generators, as the foam solution discharged from a nozzle impinges upon a foaming plate, which can be a perforated plate or screen, to generate foam, the foam expands into a large volume of stable bubbles without the need for a forced-air system. Aspirated-type generators can be more efficient and lighter than forced air-type foam generators because a fan is not required.

Conventional aspirated-type foam generators can include a header assembly having a nozzle manifold with a distribution header configured to receive a foam solution from, for example, a foam proportioning system. Depending on the design, the distribution header of a foam generator can be a curved header that forms a circle, a spoke-type header, a linear header, or some combination thereof. The nozzle manifold can include a plurality of nozzle assemblies in which each nozzle assembly includes a nozzle for discharging the foam solution toward a foam generator assembly. The nozzles in some generators can have flat tips or conical tips. Some conventional nozzles can further include a nozzle insert to change the flow characteristics of the foam solution stream as it is discharged. The generator assembly is generally arranged proximate the nozzle manifold to receive the discharged foam solution and generate the foam.

An example of an aspirated-type foam generator can be found in U.S. Pat. No. 7,975,773 ("the '773 patent"). The foam generator includes a header assembly, which includes a header with nozzles, and a foam generator assembly. As the foam solution is sprayed from the header assembly, the foam generator of the '773 patent draws air from the surrounding area into the foam generator to generate foam as the foam solution impinges upon a foaming plate or screen. The '773 patent generator includes a circular header with emission nozzles that appear to have conical tips. To minimize the adverse effects of smoke on the foam expansion rate, the '773 patent discloses changing the foam solution concentration and regulating the air flow through the foam generator by use of netting flow curtains, compressed gasses, reduced nozzle discharge pressure, and/or adding nozzles to an existing design. Another example of an aspirated-type foam generator can be found in Korean patent No. KR100917277 ("KR277"). KR277 purports to solve the problem of spray interference in conical-shaped foam generators by using a rectangular-shaped foam generator. The conical-shaped foam generator in KR277 has a header in which the nozzles extend outwardly from a central pipe in a spoke-type arrangement. The rectangular-shaped foam generator in KR77, however, uses a linear header in which the nozzles are arranged longitudinally along the header. The linear header includes attached nozzles that spray the foam solution into a rectangular body that then directs the foam solution to a tapered section including perforated screens or plates. The nozzles in KR277 have a flat tip and, at least for the rectangular-shaped foam generator, the nozzles include a vortex insert to twist the flow of the foam solution. In another example, known commercial aspirated-type foam generators ("known commercial generators") can have foam expansion ratios in excess of 830:1. The known commercial generators can include a circular header for receiving the foam solution and, depending on the model, include 6 to 8 nozzles for discharging the foam solution. The nozzles of some known commercial generators can include a flat tip. The known commercial generators can be limited to nozzle inlet pressures in a range of 43.5 psi (3 bar) to 101 psi (7 bar) in order to achieve predetermined foam expansion ratios.

Although KR277 discloses use of a nozzle insert and changing the shape to a foam generator to reduce spray interference, the above-described related art does not specifically teach techniques to increase the efficiency of a foam generator. These techniques can include improving the efficiencies of one or more components of a HEF foam generator, such as, for example, the relative dimensions of a foam generator assembly, the relative arrangement of a header assembly with respect to a foam generator assembly, the relative dimensions of a header assembly (including the shape of a header assembly), the relative arrangement of the nozzle with respect to the header, and/or the relative dimensions of a nozzle (including the shape of the nozzle and insert). It is believed that by increasing the efficiency of one or more components of a foam generator by using one or more of these techniques the overall efficiency of the foam generator can be increased. For example, while not being limited to any particular theory, the limited inlet pressure range of known foam generators can be due to inefficiencies in the design of one or more features of the foam generators. It is believed, for example, that nozzle manifolds that include curved headers and/or manifolds that do not provide for enough distance between the manifold and nozzle inlet can introduce pressure variances that adversely affect the flow of the foam solution and the efficiency of the nozzles. In addition, it is also believed that nozzles with a flat tip and/or with an insert having slots, gaps and/or other similar features can introduce flow variances in the outlet jet stream that adversely affect the efficiency of the aspiration of the air. Accordingly, by improving the efficiencies of one or more known foam generator components, the over efficiency of foam generators can be improved such as, for example, by expanding the inlet pressure range of foam generators, reducing the number of nozzles needed to generate a given volumetric foam flow rate, and/or using less foam solution than related art foam generators.

SUMMARY OF THE INVENTION

Preferred embodiments of the invention are directed to aspirated-type high-expansion foam generators and methods for generating high-expansion foam. In some embodiments, a high-expansion foam generator includes a nozzle manifold that is configured to receive a foam solution. The high-expansion foam generator preferably also includes one or more nozzles attached to the nozzle manifold. The high-expansion foam generator can be an aspirated-type foam generator in which the one or more nozzles are configured to discharge the foam solution such that a jet stream of the foam solution aspirates surrounding air into the foam generator due to a differential pressure between the surrounding atmosphere and the lower pressure in the foam generator created by the foam solution jet streams. In some embodiments, the high-expansion foam generator includes a foam generator assembly and a ratio of a largest inlet dimension of the foam generator assembly to a length of the foam generator assembly is 0.50 or less. In some embodiments, the high-expansion foam generator is configured to generate foam at a predetermined flow rate that can be, for example, at a rate of at least 1,000 cubic feet per minute (CFM), at a rate of at least 2,000 CFM, at a rate of at least 2,900 CFM, at a rate of at least 4,000 CFM, at a rate of at least 9,000 CFM, at a rate of 10,000 CFM, and/or at a rate of at least 12,500 CFM. Preferably, the high-expansion foam generator can generate the foam at the predetermined flow rate with less than six nozzles, more preferably with four nozzles or less, and even more preferably with three nozzles or less.

In some embodiments, the high-expansion foam generator is configured to generate foam at a foam expansion ratio that is in a predetermined range for a nozzle inlet pressure in a range of 29 psi (2 bar) to 101 psi (7 bar). Preferably, the predetermined expansion ratio can be in a range of 400 to 1100, more preferably in a range of 400 to 1000, even more preferably in a range of 400 to 900, and still more preferably in a range of 400 to 800. In some embodiments, the high-expansion foam generator generates foam at an expansion ratio of at least 400 for a nozzle inlet pressure of 40 psi (2.76 bar) or less.

In some embodiments, the nozzle manifold includes at least two headers that are connected to each other. The headers can have linear configurations with at least two headers being disposed orthogonal to each other. Preferably, one or more nozzle housings are disposed on each header with each nozzle housing configured to receive a nozzle. In some embodiments, a ratio of a diameter of an inlet of the respective nozzle to a distance from an inner wall surface of the corresponding header to the inlet of the respective nozzle is 0.8 or less. In some embodiments, the nozzle tip can be cone shaped with a tip surface of the nozzle forming an angle with a base of the nozzle that is in a range of 40 degrees to 50 degrees. In some embodiments, the nozzle can include a nozzle insert that includes two swirl vanes that split a flow path of the foam solution into two curvilinear paths through the nozzle. Each flow path preferably includes a crossover path that transitions the respective flow path from an upstream side of a swirl vane to a downstream side of the other swirl vane. Preferably, the crossover path is defined by a non-sharp transition member such as, for example, a chamfer, in the nozzle insert.

Some embodiments of the present disclosure are directed to methods for generating high-expansion foam. In some embodiments, the method includes providing a first foam generator portion having a tapered configuration and a second foam generator portion having a tapered configuration. Preferably, the second foam generator portion is connected to an apex of the first foam generator portion and protrudes into an interior of the first foam generator portion. The method further includes generating a foam by spraying a foam solution against the first and second foam generator portions. Preferably, respective jet streams from the one or more nozzles aspirate the surrounding air due to a differential pressure between the surrounding atmosphere and the lower pressure in the foam generator created by the foam solution jet streams. In some embodiments, the method is performed using less than six nozzles. Preferably, some exemplary methods include providing a foam solution that is in a laminal flow region to one or more nozzles. In some embodiments, a method for generating high-expansion foam can include generating foam at a foam expansion ratio of at least 400 at a nozzle inlet pressure of 40 psi (2.76 bar) or less. In some methods, the generating of the foam is at a rate of at least 4,000 CFM.

Some exemplary embodiments can include an HEF generator with nozzles in a range of 0.5 to 0.6 GPM/(psi)$^{1/2}$ K-factor that can meet or exceed the expansion ratios of related art generators with nozzles in a range of 1.25 to 1.35 GPM/(psi)$^{1/2}$. By using lower K-factor nozzles, for the same number of nozzles, some exemplary embodiments of the HEF generator can meet predetermined foam expansion ratios while using less foam solution than related art HEF generators. Some exemplary embodiments can include an HEF generator having one or more of the following that allow for generation of foam at a rate of at least 2000 CFM and at a spray inlet pressure of 40 psi or less: number of nozzle assemblies being less than six; at least one main header that receives a foam solution from an external source and at least one sub-header that is connected to the at least one main header and configured to receive the foam solution from the at least one main header, with the at least one main header and the at least one sub-header having linear configurations and with the at least one sub-header being disposed orthogonal to the at least one main header; a tip of each nozzle having a cone shape; each nozzle insert including swirl vanes that split a flow path of the foam solution through the respective nozzle into at least two curvilinear paths that have solid surfaces, with each curvilinear path including a crossover path that transitions the respective flow path from an upstream side of a swirl vane to a downstream side of another swirl vane, and with the crossover path being defined by a non-sharp transition member in the nozzle insert; or a nozzle manifold including at least one nozzle housing configured to receive a respective nozzle of the at least one nozzle assembly, with each nozzle housing being disposed on the header such that a ratio of a diameter of an inlet of the respective nozzle to a distance from an inner wall surface of the header to the inlet of the respective nozzle is 0.8 or less.

While multiple configurations of an aspirated-type high-expansion foam generator and methods for generating high-expansion foam are discussed below, it will become apparent to those skilled in the art from the following detailed description that the configuration of the aspirated-type high-expansion foam generator can vary (e.g., based on the configuration of the room to be protected, and/or some other design criteria). Accordingly, the drawings and detailed description are to be regarded as illustrative in nature and not restrictive.

BRIEF DESCRIPTIONS OF THE DRAWINGS

The accompanying drawings, which are incorporated herein and constitute part of this specification, illustrate exemplary embodiments of the invention, and, together with the description given above, serve to explain the features of the invention.

DETAILED DESCRIPTION

Embodiments of the present invention are directed to an aspirated-type high-expansion foam generator. As used herein, an "aspirated-type high-expansion foam generator" means a foam generator that has no moving parts and uses aspirated air as the primary means to generate foam. For example, rather than forcing air into the foam generators by using motor-operated or water-operated fans, the foam generator draws in the surrounding air into the foam generator.

Figure 1:
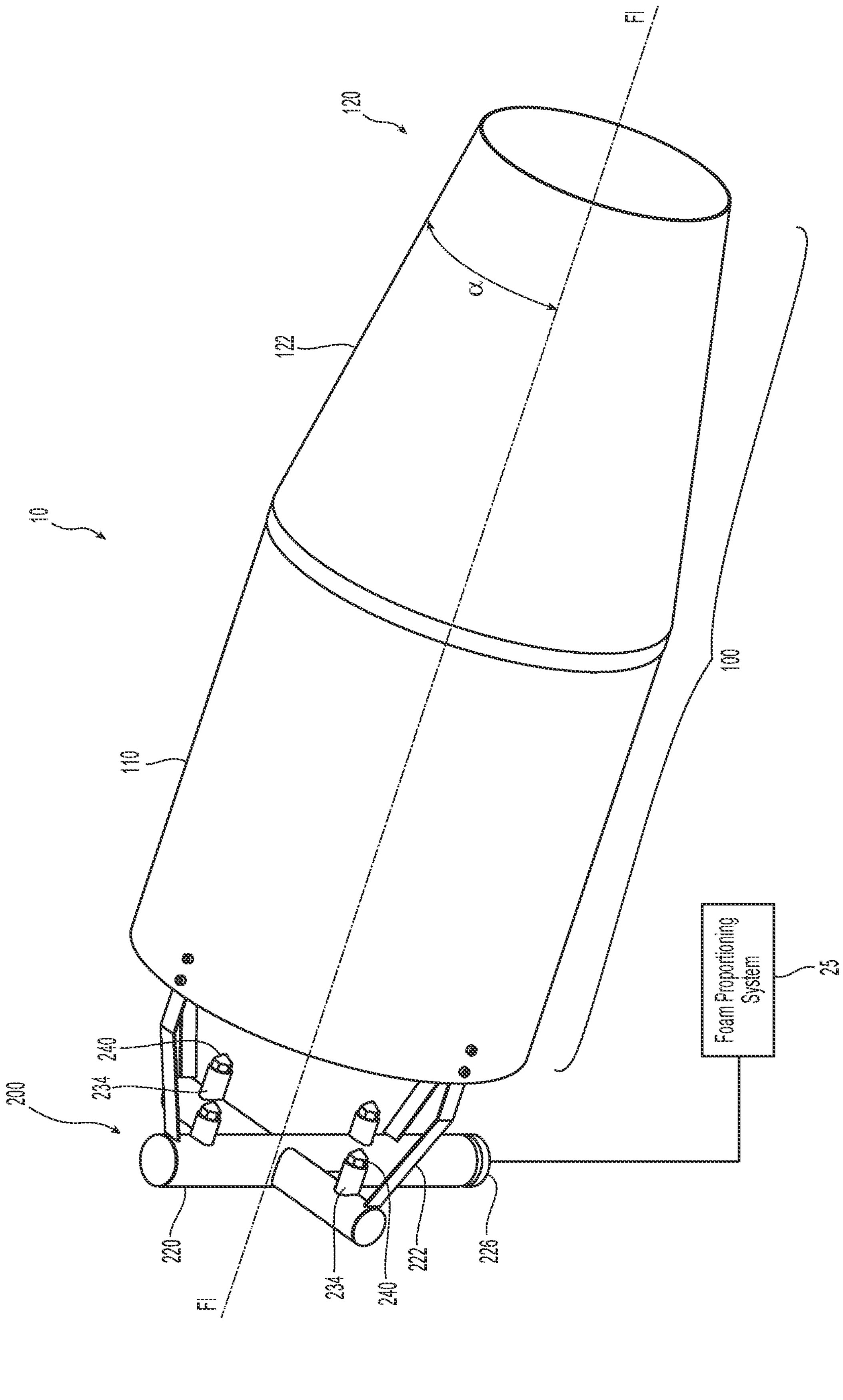
FIG. 1 illustrates a perspective view of a high expansion foam generator in accordance with an embodiment of the present invention.
Figure 2:
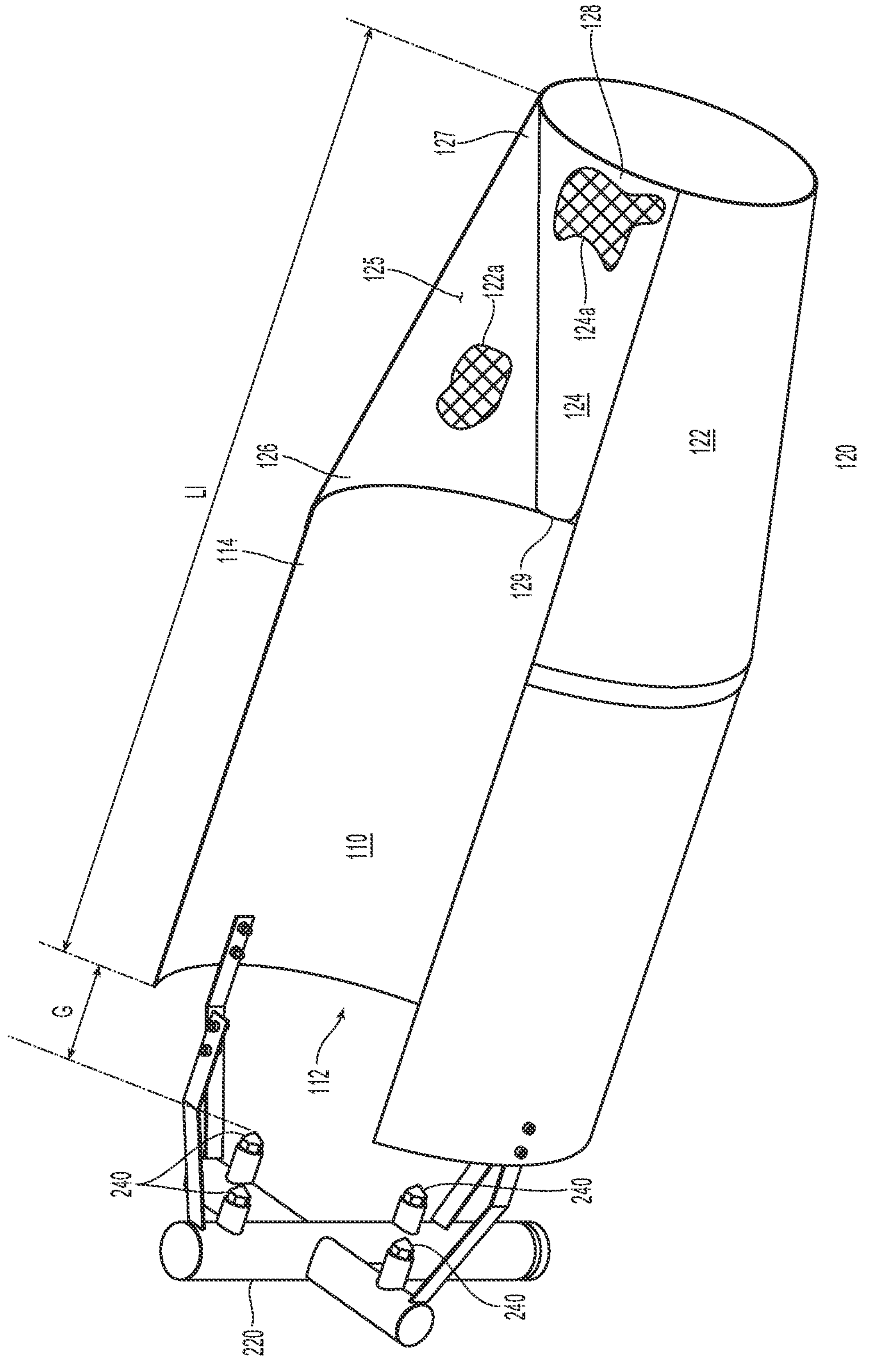
FIG. 2 is a cross-sectional view of the high expansion foam generator of FIG. 1.
Figure 3:
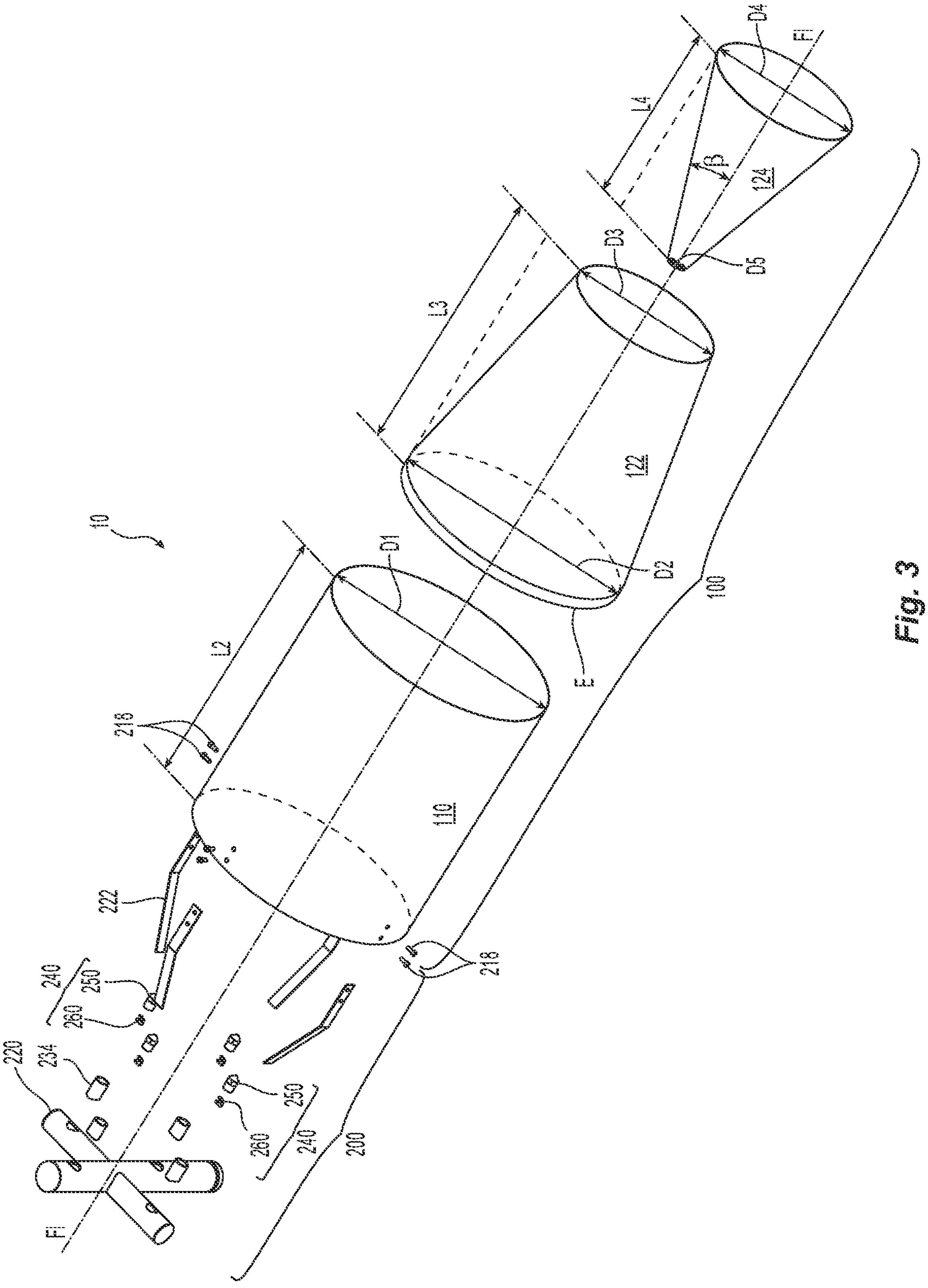
FIG. 3 is an exploded view of the high expansion foam generator of FIG. 1.

FIG. 1 illustrates a perspective view of a high expansion foam (HEF) generator 10 in accordance with an embodiment of the present invention. FIG. 2 is a cross-sectional view of the HEF generator 10, and FIG. 3 is an exploded view of the HEF generator 10. The HEF generator 10 can preferably be configured to provide fire protection to an enclosure (e.g., a hangar, warehouse, cargo area, a large space, or another volume sufficient to hold the foam) by generating a fire suppression foam using a foam solution containing a fluid (e.g., water) and a foam concentrate. In some embodiments, the HEF generator 10 can provide fire protection to an enclosure in compliance with Underwriters Laboratories (UL) Standard "UL 139 Outline of Investigation for Medium- and High-Expansion Foam" dated Mar. 13, 2018 ("UL 139"), which is incorporated herein by reference in its entirety. For example, to comply with UL 139, for a foam solution that has been certified under UL 139, the HEF generator must generate foam at the foam expansion ratio and/or within the foam expansion ratio range that has been approved by the UL testing authority.

With reference to FIGS. 1-3, the HEF generator 10 can receive the foam solution from an external source such as, for example, foam proportioning system 25. The foam proportioning system 25 can create the foam solution by mixing a fire suppression foam concentrate (e.g., a commercially available concentrate) and a fire suppression fluid (e.g., water). The foam proportioning system can include one or more tanks to hold the foam concentrate and/or the fire suppression fluid. In some embodiments, the source of the fire suppression fluid can be the municipal water system instead of a tank. The foam proportioning system 25 can include a pump to pump fire suppression fluid (e.g., water) and/or the foam concentrate. The foam proportioning system 25 can also include a proportioner that receives and mixes (e.g., by a venturi effect) the fire suppression fluid and the foam concentrate to generate the foam solution. The foam solution is then pumped, e.g., by using the pump, to the HEF generator 10. Foam proportioning systems that generate foam solutions are known in the art and thus, for brevity, will not be further discussed.

The HEF generator 10 preferably includes a solution discharge assembly 200 and a foam generator assembly 100. In some embodiments, the solution discharge assembly 200 includes a nozzle manifold 220 and one or more nozzle assemblies 240. The nozzle manifold 200 preferably includes one or more headers (e.g., a main header 224 and sub-headers 230*a,b*—see FIG. 4) and one or more nozzle housing 234 disposed on each header. The nozzle manifold 220 is preferably configured to receive the foam solution from the foam proportioning system 25 and distribute the foam solution to the one or more nozzle assemblies 240. Each nozzle assembly 240 preferably includes a nozzle 250 and/or a nozzle insert 260. In some embodiments, the nozzle 250, preferably including the insert 260, attaches to the nozzle housing 234 and the nozzle 250 is preferably configured to discharge the foam solution into the foam generator assembly 100. In some embodiments, the HEF generator 10 is configured as an aspirated-type high-expansion foam generator. That is, in contrast to some prior art systems, exemplary embodiments of the present disclosure do not rely on a motor-operated fan and/or a water operated fan to force air into the body of the foam generator. In exemplary embodiments of the present disclosure, when the foam solution is discharged from the one or more nozzles 250, the jet streams from the nozzles 250 aspirate air into the foam generator assembly 100 due to a differential pressure between the surrounding atmosphere and the lower pressure in the foam generator created by the foam solution jet streams. Thus, exemplary embodiments of the HEF generator 10 have no moving parts. In some embodiments, the HEF generator 10 can include a gap G between the outlet of the one or more nozzles 250 and the inlet 112 of the foam generator assembly 100 to facilitate the entry of air into the foam generator assembly 100. For example, in some embodiments, the nozzle manifold 220 can include manifold support arms 222 that attach (e.g., using fasteners 218, welding, or via some other attachment means) to the foam generator assembly 100 at, for example, appropriate attachment locations on the foam generator body (e.g., main body portion 110). The manifold support arms 222 can be configured such that, when the nozzle manifold 220 is attached to the foam generator body, the nozzle manifold 220 is disposed a predetermined distance from the foam generator body. The predetermined distance is such that the gap G is in a range of 6.5 in. (165 mm) to 12 in. (305 mm). In some embodiments, the gap G is in a range of 6.5 in. (165 mm) to 7.5 in. (190.5 mm), and more preferably 7 in.±0.25 in (178 mm±5 mm). In some embodiments, the gap G is in a range of 9.5 in. (241 mm) to 10.5 in. (267 mm), and more preferably 10 in.±0.25 in (254 mm±5 mm). Of course, embodiments of the present disclosure are not limited to using manifold support arms 222 as a means of attachment and other means can be used to maintain a predetermined distance between the discharge assembly 200 and the foam generator assembly 100. Preferably, the discharge assembly 200 is attached and/or aligned to the foam generator assembly 100 such that the foam generator assembly 100 and the one or more nozzle assemblies 230 are aligned along an axis F1, which corresponds to a centerline of the foam generator assembly 100. Preferably, the axis F1 corresponds to an average flow path of the foam solution.

The foam generator assembly 100 preferably receives the foam solution sprayed from the discharge assembly 200 and the aspirated air to generate a fire suppression foam that can be discharged into an enclosure to be protected. In some embodiments, the overall length L1 of the foam generator assembly 100 can be in a range of 50 in. (1270 mm) to 85 in. (2159 mm). In some embodiments, the length L1 can be in a range of 50 in. (1270 mm) to 55 in. (1397 mm), and more preferably 53 in.±1 in. (1346 mm±25 mm). In other embodiments, the length L1 can be in a range of 72 in. (1829 mm) to 85 in. (2159 mm), and more preferably 79 in.±1 in. (2007 mm±25 mm). In some embodiments, a ratio of the gap G to the length L1 is 0.125 or greater, more preferably in a range of 0.125 to 0.132, and even more preferably 0.127±1.

In some embodiments, the foam generator assembly 100 can be segmented into two or more portions. For example, the foam generator assembly 100 can include a main body portion 110 and a foam generator portion 120, which preferably attaches to the body portion 110. The body portion 110 preferably defines a passageway in which the foam solution travels prior to impinging on a surface of the foam generator portion 120. The body portion 110 can include an inlet end 112 that receives the foam solution from the nozzle assemblies 240 and the aspirated air. The body portion 110 can also include a distal end 114 that is proximate to the foam generator portion 120. In some embodiments, the body portion 110 attaches to the foam generator portion 120 at the distal end 114 (e.g., via soldering, welding, fasteners, bonding, and/or some other attachment means). In some embodiments, the discharge assembly 200 is preferably disposed such that the outlet of the one or more nozzles 250 is at a predetermined distance from the inlet 112 of the foam generator assembly 100. Preferably, the body portion 110 has a length L2 that is in a range of 25 in. (635 mm) to 45 in. (1143 mm). In some embodiments, the length L2 can be 25 in. (635 mm) to 30 in. (762 mm), and more preferably 27.5±1 in. (699 mm±25 mm). In other embodiments, the length L2 can be 40 in. (1016 mm) to 43 in (1092 mm), and more preferably 41.75 in.±1 in. (1060 mm±25 mm). In some embodiments, the body portion 110 can include one or more expansion joints (not shown) near the inlet 112 and/or the distal end 114 to mitigate stresses in the interfaces between the body portion 110 and the manifold assembly 220 and/or between the body portion 110 and the foam generator portion 120. In some embodiments, the body portion 110 is a tube that directs the foam solution towards the foam generator portion 120. For example, in some embodiments, the body portion 110 can have a cylindrical shape with a diameter D1 that is in a range of 21 in. (533 mm) to 38 in (965 mm). In some embodiments, the diameter D1 can be in a range of 23 in (584 mm) to 25 in (635 mm), and even more preferably 24 in.±0.1 in. (610 mm±2.5 mm). In other embodiments, the diameter D1 can be in a range of 35 in. (889 mm) to 37 in. (940 mm), and even more preferably 36±0.5 in. (914 mm±13 mm). Preferably a length of the foam generator assembly is dependent on the inlet dimension. In some embodiments, a ratio of the largest inlet dimension of the foam generator assembly to a length of the foam generator assembly (also referred to herein as "generator ratio") is 0.5 or less. In some embodiments, the generator ratio can be in a range of 0.40 to 0.50, more preferably in a range of 0.42 to 0.48 and even more preferably a ratio of 0.46±0.01. For example, in the exemplary embodiments, the generator ratio is a ratio of diameter D1 to length L1. In some embodiments, the body portion 110 can have other shapes such as, for example, rectangular (e.g., square), triangular, trapezoidal, or some other polygonal shape that allows for the foam solution spray to pass through to the foam generator portion 120 while bounding the spray within the interior of the body portion 110. In embodiments that have non-circular inlet configurations, the largest inlet dimension can be used in the numerator of the generator ratio equation. For example, if the inlet to the foam generator is rectangular in shape, the largest length dimension is used.

In some embodiments, the body portion 110 can be made of sheet metal and have an appropriate thickness for the material being used and can be, for example, a standard thickness such as, e.g., 1/32 in. (0.8 mm). The sheet metal can be stainless steel and/or another appropriate metal. Of course, the body portion 110 is not limited to a metal construction and other materials can be used (e.g., composites, plastics, ceramics, and/or another appropriate material) and the thickness will vary as appropriate. Preferably, the body portion 110 is configured to attach to a fixed structure such as, for example, a wall, ceiling, roof, floor, platform, or other fixed structure using means of attachments such as, for example, brackets, bolts, screws, welding, soldering, bonding, or other means of attachment.

Preferably, the foam generator portion 120 receives the foam solution from the body portion 110 and is configured to generate a fire suppression foam that is discharged into the enclosure to be protected. In some embodiments, the foam generator portion 120 is generally tube shaped. For example, in some embodiments, the foam generator portion 120 can preferably have a conical shape and even more preferably in the shape of a frustum cone. In some embodiments, the foam generator portion 120 can be segmented into two or more parts. For example, the foam generator portion 120 can include an exterior segment 122 and an interior segment 124. The exterior segment 122 and/or the interior segment 124 can have a tapered shape in some embodiments. For example, the exterior segment 122 can have a conical shape such as, for example, a frustum cone with an inlet end 126 that is attached and/or otherwise secured to the body portion 110 and a distal end 127. Preferably, the wall of the exterior segment 122 defines an interior 125. The interior segment 124 preferably has a conical shape and, in some embodiments, can be a frustum cone. In some embodiments, the segments 122 and 124 are arranged such that interior segment 124 is disposed in the interior 125 of the exterior segment 122 and a base 128 of the interior segment 124 is attached to the distal end 127 of the exterior segment 122 (e.g., by soldering, welding, bonding, fastening via screws or bolts, or attaching by some other means). By segmenting the foam generator portion 120 into two or more parts, the surface area on which the foam solution impinges can be increased while minimizing the overall dimensions of the HEF generator 10. Of course, exemplary embodiments of the present disclosure are not limited to foam generator portions that are segmented into parts and/or limited to conical shapes or frustum shapes. For example, the foam generator portion 120 can be a single part (e.g., made from a single piece of sheet metal) and/or have other shapes such as, for example, rectangular (e.g., square), triangular, trapezoidal, and/or some other polygonal shape (with or without a frustrum).

In some embodiments, the inlet 126 of the foam generator portion 120 can have a diameter that is approximately the same as the diameter at the distal end 114 of the body portion 110. For example, the diameter D2 at the inlet 126 can be in a range of 21 in. (533 mm) to 38 in (965 mm). In some embodiments, the diameter D2 can be in a range of 23 in (584 mm) to 25 in (635 mm), and even more preferably 24 in.±0.1 in. (610 mm±2.5 mm). In other embodiments, the diameter D2 can be in a range of 36 in. (914 mm) to 37 in. (940 mm), and even more preferably 36.5±0.1 in. (927 mm±2.5 mm). Preferably, the length L3 of the exterior segment 122 (and, in some embodiments, the overall length of the foam generator portion 120) along the axis F1 is in a range of 23 in. (584 mm) to 40 in. (1016 mm). In some embodiments, the length L3 can be in a range of 24.5 in. (622 mm) to 26.5 in. (673 mm), and more preferably 25.5 in.±0.1 in. (648 mm±2.5 mm). In other embodiments, the length L3 can be in a range of 35 in. (889 mm) to 37 in. (940 mm), and more preferably 36 in.±0.1 in. (914 mm±2.5 mm). In some embodiments, to facilitate attachment to the body portion 110, the length of body portion 110 and/or the exterior segment 122 can include an extension E (see FIG. 3) that is in a range of approximately 0.8 in. to 1.5 in. (20 to 38 mm) in order to provide a predetermined overlap at the inlet side 126. In some embodiments, when the exterior segment 122 has a cone shape or a frustum cone shape, the slope of the cone portion forms an angle $\alpha$ with the axis F1 (see FIG. 1) that is in a range of 5 degrees to 15 degrees. In some embodiments, the angle $\alpha$ can be 8 degrees to 12 degrees, and more preferably 10 degrees±1 degree. The distal end 127 of the exterior segment 122 (e.g., the apex of the frustum cone shape of the exterior segment 122) can have a diameter D3 in a range of 13 in. (330 mm) to 26 in. (660 mm). In some embodiments, the diameter D3 can be in a range of 14 in. (356 mm) to 16 in. (406 mm), and even more preferably 15 in.±0.1 in. (381 mm±2.5 mm). In other embodiments, the diameter D3 can be in a range of 22.5 in. (572 mm) to 24.5 in. (622 mm), and even more preferably 23.5 in (597 mm±2.5 mm).

In some embodiments, the base 128 of the interior segment 124 can have a diameter that is approximately the same as the diameter at the distal end 127 of the main segment 122. For example, the diameter D4 at the base 128 can be in a range of 13 in. (330 mm) to 26 in. (660 mm). In some embodiments, the diameter D4 can be in a range of 14 in. (356 mm) to 16 in. (406 mm), and even more preferably 15 in.±0.1 in. (381 mm±2.5 mm). In other embodiments, the diameter D4 can be in a range of 22.5 in. (572 mm) to 24.5 in. (622 mm), and even more preferably 23.5 in (597 mm±2.5 mm). Preferably, the length L4 of the interior segment 124 along the axis F1 is in a range of 19.5 in. (495 mm) to 33.5 (851 mm). In some embodiments, the length L4 can be in a range of 20.5 in. (521 mm) to 22.5 in. (572 mm), and more preferably 21.25±0.1 in. (540 mm±2.5 mm). In other embodiments, the length L4 can be in a range of 30.5 in. (775 mm) to 32.5 in. (826 mm), and more preferably 31.5 in.±0.1 in (800 mm±2.5 mm). In some embodiments, when the interior segment 124 has a cone shape or a frustum cone shape, the slope of the cone portion forms an angle $\beta$ with the axis F1 that is in a range of 12 degrees to 20 degrees. In some embodiments, the angle $\beta$ can be in a range of 15 degrees to 19 degrees, and more preferably 17 degrees±0.5 degree. When the interior segment 124 has a frustum cone shape, the distal end 129 of the interior segment 124 (e.g., the apex of the frustum cone shape of the interior segment 124) can have a diameter D5 in a range of 1 in. (25 mm) to 6 in. (152 mm). In some embodiments, the diameter D5 can be in a range of 1.5 in. (38 mm) to 2.5 in. (63.5 mm), and more preferably 2.0 in.±0.1 in. (51 mm±2.5 mm). In other embodiments, the diameter D5 can be in a range of 3 in. (76 mm) to 5 in. (127 mm), and more preferably 4 in. (102 mm±2.5 mm).

Preferably, the interior 125 of the foam generator portion 120 includes a surface (e.g., surface **122*a* of exterior segment 122 and/or surface 124*a* of interior segment 124) that facilitates the generation of the foam. For example, in some embodiments, the surface 122*a* and/or the surface 124*a* of the foam generator portion 120 can have a plurality of openings that go through the wall(s) of the foam generator portion 120. For example, the walls(s) of the foam generator portion 120 (e.g., exterior segment 122 and/or interior segment 124) can be constructed from a perforated sheet, a mesh screen, and/or some other material with a plurality of holes (e.g., metal wires, or similar structures, in a web-like pattern with evenly spaced openings) having a mesh size of about ⅛ in. (3.2 mm). The foam solution from the body portion 110 preferably impinges on the surface 122*a* and/or surface 124*a* at a velocity that will cause the foam solution to become a foam. More specifically, as the foam solution impinges on the surface 122*a* and/or surface 124*a* and passes through the mesh openings, air is encapsulated or entrained by the foam solution to form bubbles and generate the foam. Once the foam solution passes through the surface openings of the foam generator portion 120, the foam enters the enclosure to suppress the fire. In some embodiments, depending on the inlet pressure, an expansion ratio of the HEF generator 10 can be in a range of 400 to 1100, preferably in a range of 400 to 1000, more preferably in a range of 400 to 900, and even more preferably in a range of 400 to 800. In some embodiments, all or a portion of the foam generator portion 120 (e.g., the exterior segment 122 and/or the interior segment 124) can be made of sheet metal (e.g., a perforated sheet metal) that has a standard thickness for the material such as, for example, 1/32 in. (0.8 mm). The sheet metal can be stainless steel and/or another appropriate metal. Of course, the foam generator portion 120** is not limited to a metal construction and other materials can be used (e.g., composites, plastics, ceramics, and/or another appropriate material.

Figure 4:
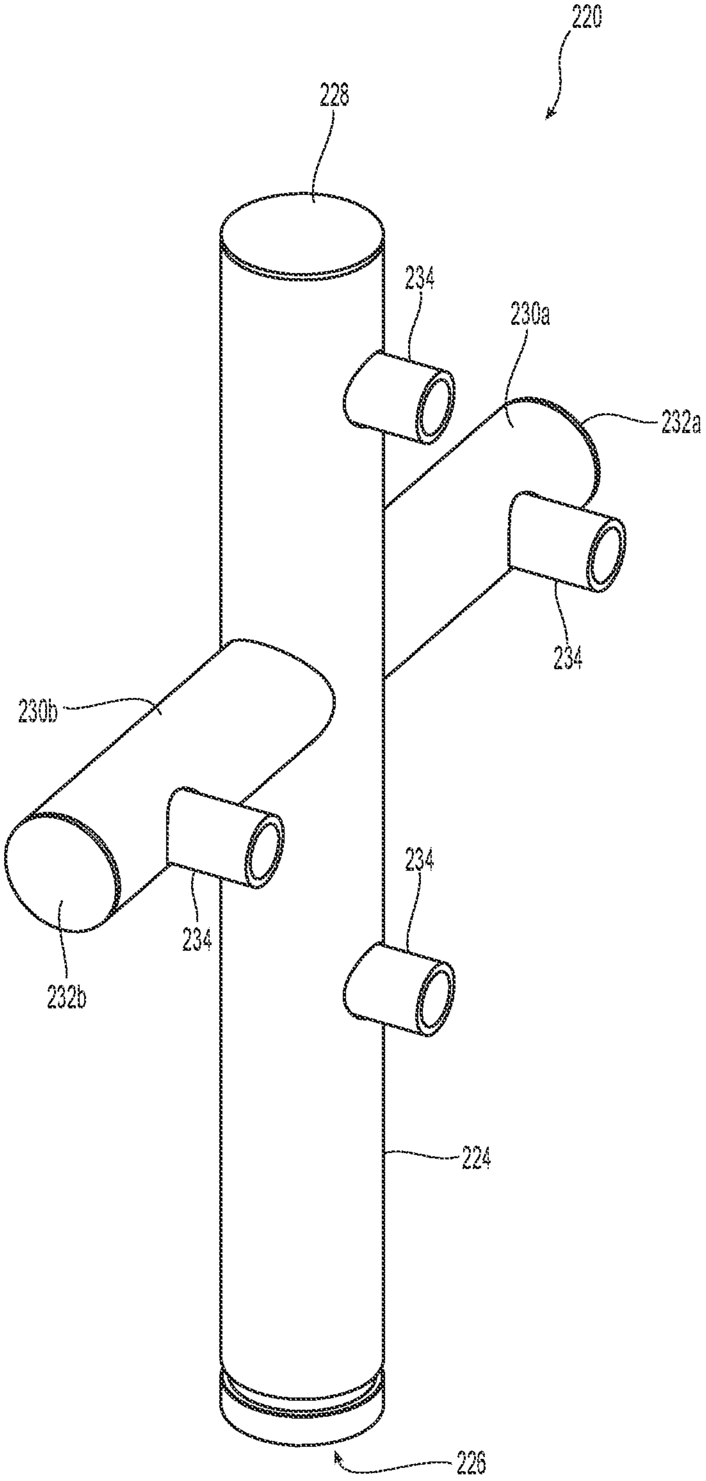
FIG. 4 is a perspective view of a nozzle manifold in accordance with an embodiment of the present invention.
Figure 5:
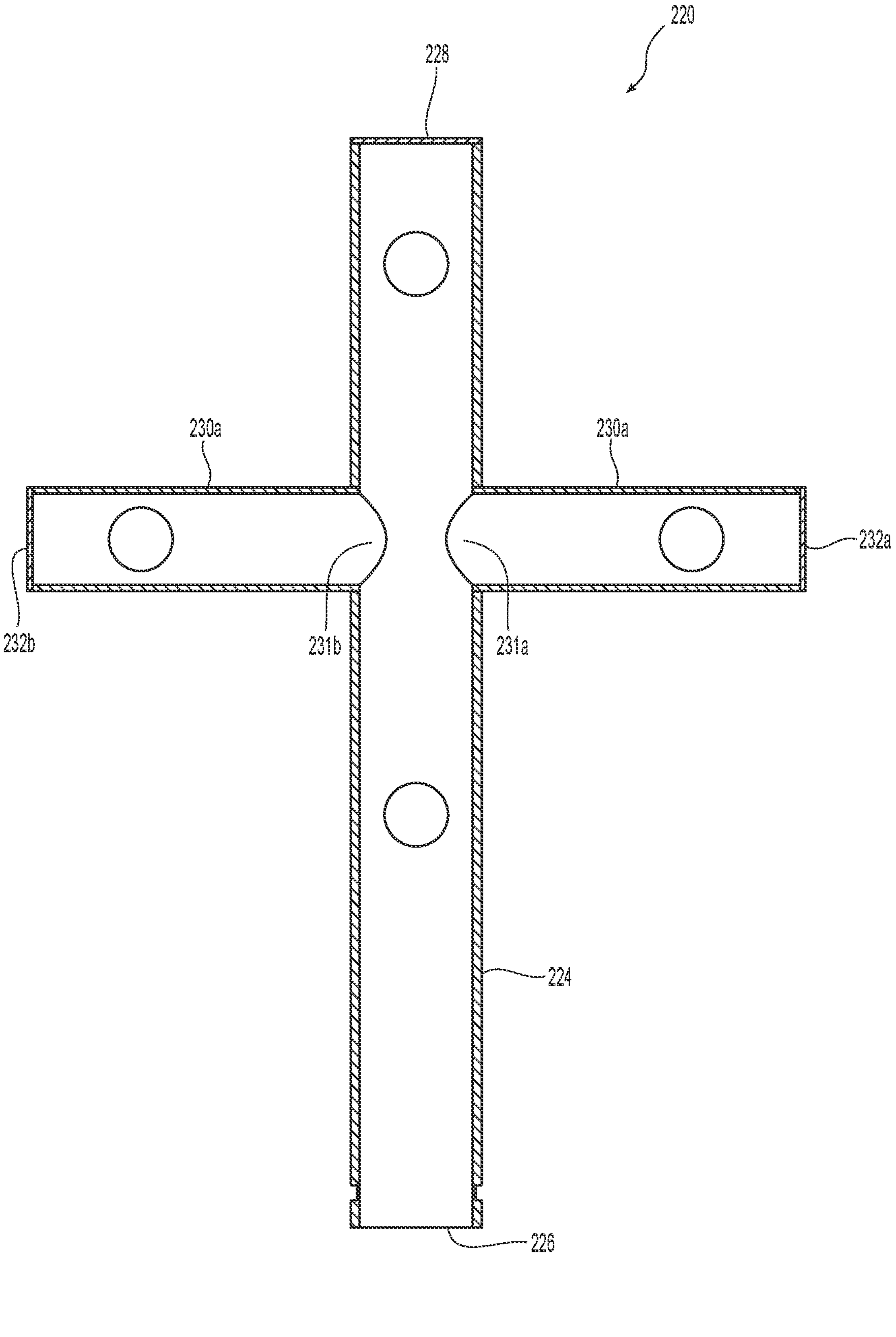
FIG. 5 is a front cross-sectional view of the nozzle manifold of FIG. 4.
Figure 6:
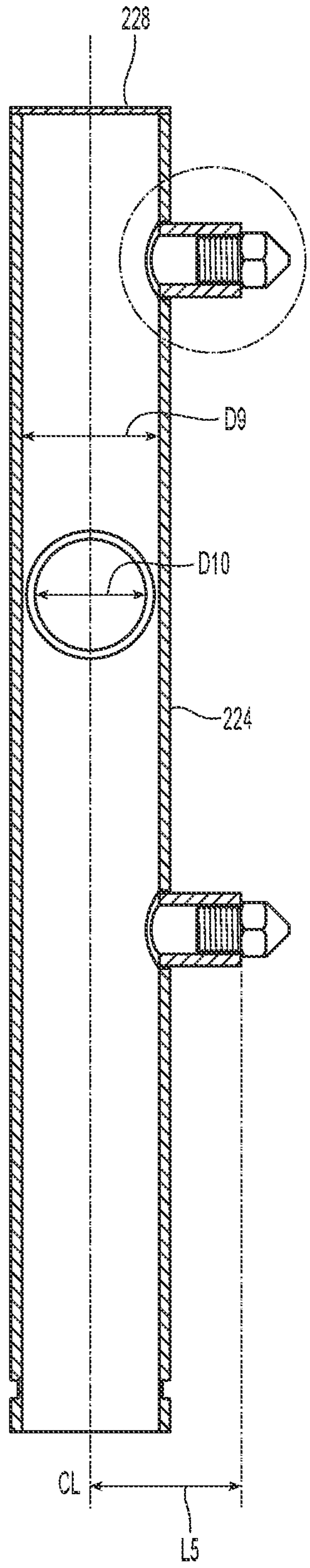
FIGS. 6 and 6A are a side cross-sectional view of the nozzle manifold of the FIG. 4 and an expanded view of the interface between the nozzle manifold and a nozzle, respectively.
Figure 6A:
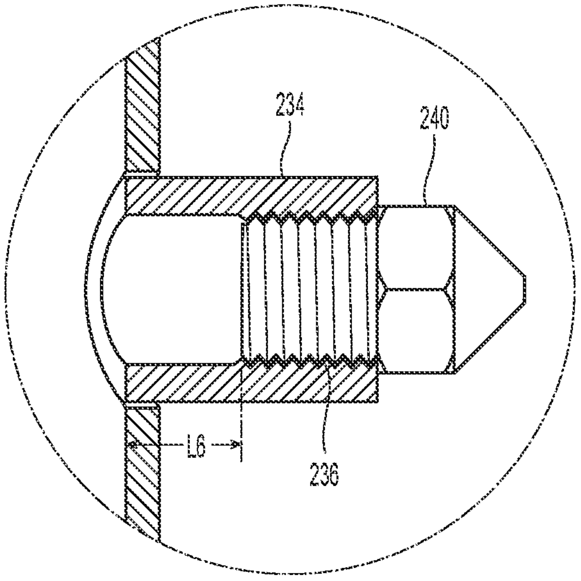

FIGS. 4 and 5 are a perspective view and a front cross-sectional view of the nozzle manifold 220, respectively. FIGS. 6 and 6A are a side cross-sectional view of the nozzle manifold 220 and an expanded view of the interface between the nozzle manifold 220 and a nozzle 250, respectively. With reference to FIGS. 4-6A, the nozzle manifold 220 can preferably include one or more nozzle headers that are each configured to distribute foam solution through one or more nozzles 250. In embodiments where there is more than one nozzle 250, the nozzle manifold 220 is preferably configured to evenly distribute the volumetric flow (also referred to herein as "flow") of the foam solution through the nozzles 250. In some embodiments, the nozzle manifold 220 can have one or more main headers that receive the foam solution. As used herein, "main header" means a header receiving foam solution from an external supply. For example, exemplary embodiments can include a main header 224 that receives the foam solution at the inlet 226 from, for example, foam proportioning system 25.

In some embodiments, each of the main headers can include one or more sub-headers that are fluidly connected to the respective main header. As used herein, "sub-header" means a header receiving foam solution from a main header. For example, sub-headers 230*a,b* can be fluidly connected to the main header 224 such that the foam solution in the main header 224 flows to the sub-headers 230*a,b*. Preferably, the main header 224 and/or the sub-headers 230*a,b* have a substantially linear configuration such as, for example, a linear tube-shaped configuration. For example, the main header 224 can have a linear tube-shaped configuration with an inlet 226 and a closed end 228 disposed opposite the inlet 226. The tube-shaped configuration for the main header 224 is preferably a cylindrical configuration, but other configurations are possible such as rectangular (e.g., square), triangular and/or another polygonal shape. Similarly, one or both of the sub-headers 230*a,b* preferably have a linear tube-shaped configuration. The tube-shaped configuration for the sub-headers 230*a,b* is preferably a cylindrical configuration, but other configurations are possible such as rectangular (e.g., square), triangular and/or another polygonal shape. In some embodiments, the main header 224 and the respective sub-headers 230*a,b* are disposed crosswise to each other such as, for example, orthogonal to each other. For example, as best seen in FIG. 5, the sub-headers 230*a,b* are disposed colinear to each other and orthogonal to the main header 224 to form a plus shape or cross shape. In such a configuration, one end of each sub-headers 230*a,b* is fluidly connected to the main header 224 and the outer end 232*a,b* of the respective sub-headers 230*a,b* is closed. The foam solution enters the nozzle manifold 220 at the inlet 226 of the main header 224 and then enters the sub-headers 230*a,b* via inlets 231*a* and 231*b* of the respective sub-headers 230*a*, and 230*b*. It is believed that the linear configuration with the closed end 228 of the main header 224 and the linear configuration with the closed ends 232*a,b* of the respective sub-headers 230*a,b* serve to minimize flow disturbances as foam solution is sprayed from the nozzles 250. In contrast, some prior art nozzle manifolds can have headers (and/or portions of headers) that are circular or ring-shaped, which produce curvilinear flows through at least a portion of the manifold while foam solution is sprayed from the nozzles. It is believed that such curved header configurations (especially ring-shaped headers having no "closed ends") may create pressure variances in the header that lower the efficiency of the nozzles in comparison to the linear header configurations in some embodiments of the present disclosure. While exemplary embodiments of the present disclosure are with reference to a cross or plus-type header manifolds, in some embodiments, the nozzle header manifold can have other types of linear configurations such as, for example, an "H" shaped header in which the horizontal portion is a main header and the vertical portions are sub-headers or any other combination of main and sub-headers. Some embodiments of the present disclosure are not limited to linear headers and can have curvilinear headers (including ring-shaped headers) and/or headers having other shapes.

In some embodiments, the inside diameter D9 of the main header 224 and/or the inside diameter D10 of one or both of the sub-headers 230*a,b* is in a range of 1 in. (25 mm) to 4 in. (102 mm), and more preferably, 2 in. (51 mm) to 3.5 in. (89 mm). For example, in some embodiments, the diameter D9 of the main header 224 can be 2.5 in.±0.1 in. (64 mm±2.5 mm), and in other embodiments, the diameter D9 can be 3.0 in.±0.1 in. (76 mm±2.5 mm). In some embodiments, the diameter D10 of one or both of the sub-headers 230*a,b* can be 2.0 in.±0.1 in. (51 mm±2.5 mm), and in other embodiments, the diameter D10 can be 2.5 in.±0.1 in. (64 mm±2.5 mm). In some embodiments, main header 224 and/or the sub-headers 230*a,b* conform to known pipe standards such as, for example, British standard pipe (BSP), national pipe thread taper (NPT), and/or some other pipe standard. The main header 224 and/or one or both of the sub-headers 230*a,b* can be made of carbon steel, stainless steel, and/or some other appropriate material.

The nozzle manifold 220 is preferably configured to have one or more nozzle housings, such as, for example, nozzle housings 234, that are each configured to accept a nozzle 250. Preferably, the nozzle 250 can be fixedly attached (e.g., by soldering, welding, bonding) or detachably attached (e.g., by screwing the nozzle into the nozzle housing). For example, the nozzle housing 234 and the nozzle 250 can be configured with corresponding thread patterns (e.g., patterns that meet BSP and NPT standards) as shown by interface 236 in FIG. 6A so that the nozzle 250 can be threaded into the nozzle housing 234. Each main header 224 and/or each sub-header 230 can include one or more nozzle housings 234. Preferably, the nozzle housings 234 are distributed between the main header 224 and the sub-header 230 such that the jet sprays from the nozzles 250 are symmetrically distributed across the inlet 112 of the foam generator assembly 100. For example, as shown in FIGS. 1 and 4, four nozzle housings 234 (two nozzle housings 234 on the main header 224 and one nozzle housing 234 on each sub-header 230*a,b*) are arranged to spray foam solution into the inlet 112 of the foam generator assembly 100 in a symmetrical 90-degree pattern around the flow axis F1. Of course, other symmetrical patterns and/or non-symmetrical patterns can be used based on the shape of the foam generator assembly 100, the number of nozzles, and the desired flow pattern.

Preferably, a length L5 corresponding to a distance from the centerline of the main header 224 (shown in FIG. 6) and/or the sub-header 230 (not shown but similar) and the outlet end of the nozzle housing 234 is in a range of 2.25 in. (57 mm) to 7 in. (178 mm). In some embodiments, the length L5 can be in a range of 2.5 in. (64 mm) to 3.25 in. (83 mm), and more preferably, 2.75 in.±0.1 in. (70±2.5 mm). In other embodiments, the length L5 can be in a range of 3.25 in. (83 mm) to 4.0 in. (102 mm), and more preferably, 3.75 in.±0.1 in. (95±2.5 mm). In still other embodiments, the length L5 can be 5.5 in. (140 mm) to 6.5 in. (165 mm), and more preferably, 6.1 in.±0.1 in (155±2.5 mm). In some embodiments, a length L6 corresponding to a distance from the inner wall surface of the main header 224 (shown in FIG. 6A) and/or the sub-header 230 (not shown but similar) to the inlet of the nozzle 250 when attached to the nozzle housing 234 is in a range of 1.45 in. (37 mm) to 4.5 in. (114 mm). In some embodiments, the length L6 can be in a range of 3.5 in. (89 mm) to 4.5 in. (114 mm), and more preferably, 4.0 in.±0.5 in. (102±13 mm). In some embodiments, the configuration of the nozzle housing 234, which can include the length L6, is such that the foam solution is believed to enter a laminar flow region or state prior to entering the nozzle 250.

Figure 7:
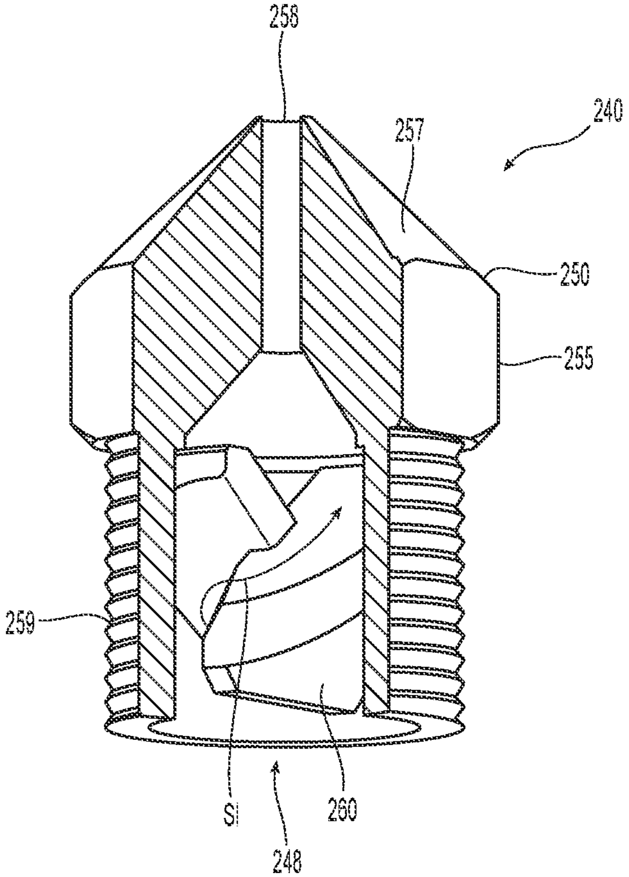
FIG. 7 is a front cross-sectional view of a nozzle and insert in accordance with an embodiment of the present invention.
Figure 8:
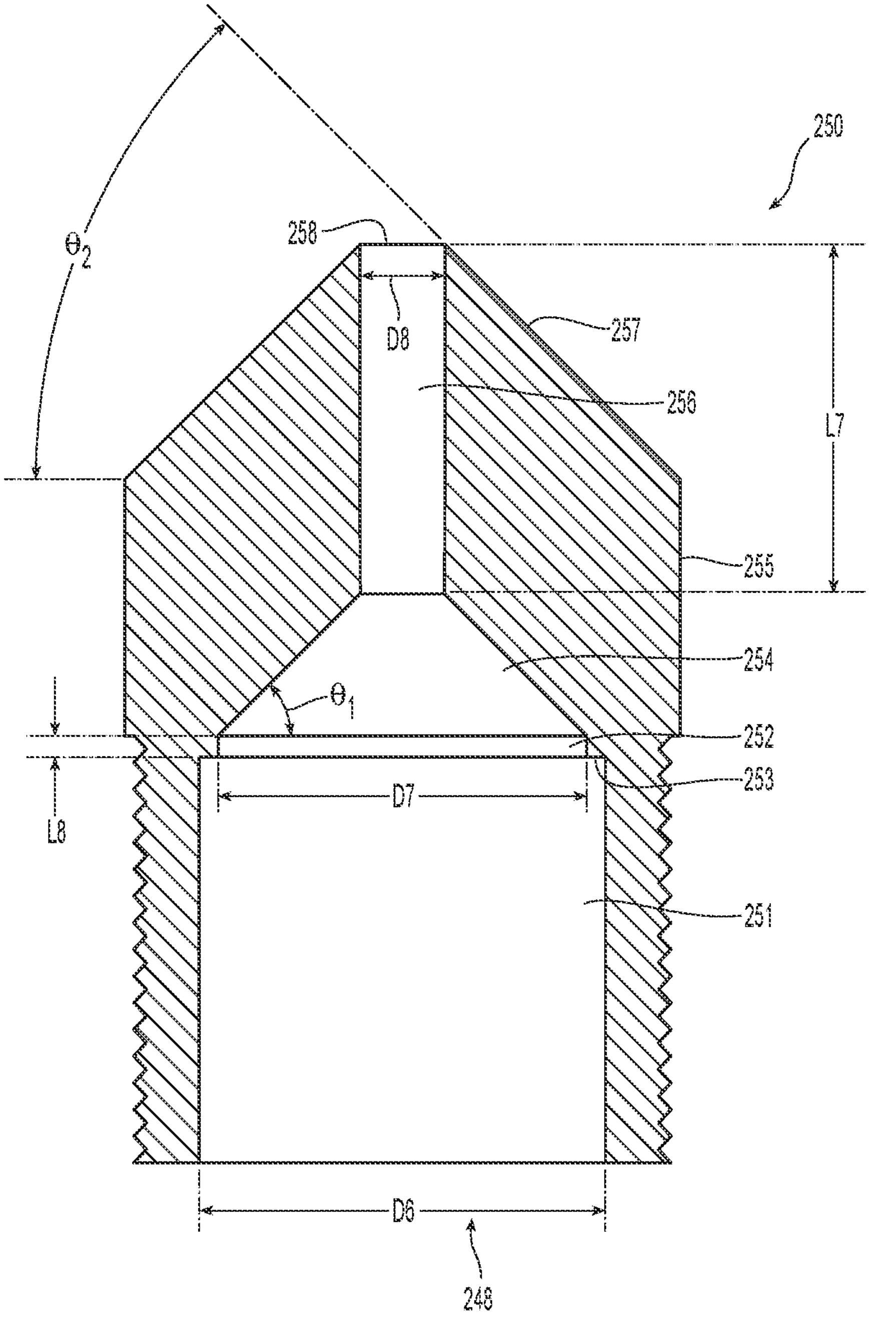
FIG. 8 is a front cross-sectional view of the nozzle of FIG. 7, with the insert removed.

FIG. 7 is a front cross-sectional view of the nozzle 250 and insert 260. FIG. 8 is a front cross-sectional view of the nozzle 250, with the insert 260 removed. The nozzle 250 is a device that controls the direction, and characteristics (e.g., flow characteristics such as velocity, flow, spray pattern, or some other characteristic) of the foam solution flow as the foam solution exits the nozzle manifold 220. Preferably, the nozzle 250 includes a main body 255 and a conical nozzle tip 257. Preferably, in some embodiments, an exterior of the nozzle 250 includes threads 259 that allow the nozzle 250 to be attached to the nozzle housing 234 on the nozzle manifold 220. In some embodiments, the nozzle 250 can have an inlet 248 that receives the foam solution from the nozzle manifold 220 and an outlet 258 through which the foam solution is sprayed into the foam generator assembly 100. Preferably, the diameter D6 of inlet 248 of the nozzle 250 is in a range from 0.5 in. (13 mm) to 1.5 in. (38 mm), and more preferably 0.75 in. (19 mm) to 1.25 in. (32 mm). For example, in some embodiments, the diameter D6 can be 0.75 in.±0.1 in. (19 mm±2.5 mm) and in other embodiments, the diameter D6 can be 1.25 in.±0.1 in. (32 mm±2.5 mm). In some embodiments, a ratio of D6 to L6 (also referred to herein as "nozzle housing ratio") is 0.8 or less. In some embodiments, the nozzle housing ratio can be in a range of 0.25 to 0.80, more preferably in a range of 0.28 to 0.35 and even more preferably a ratio of 0.32±0.01.

Preferably, the diameter D8 of the outlet 258 of the nozzle 250 is in a range from 0.10 in. (2.5 mm) to 0.5 in. (13 mm), and more preferably 0.12 in. (3 mm) to 0.4 in. (10 mm). For example, in some embodiments, the diameter D8 can be 0.15 in.±0.01 in. (3.8 mm±0.25 mm) and in other embodiments, the diameter D8 can be 0.375 in.±0.01 in. (9.5 mm±0.25 mm). Between the inlet 248 and outlet 258, the nozzle 250 can include one or more internal chambers. For example, as best seen in FIG. 8, the nozzle 250 can include a main chamber 251 that extends from the inlet 248 and preferably has the same diameter as the inlet 248. In some embodiments, the main chamber 251 is configured to receive an insert (discussed below) and/or can be the largest chamber of the nozzle 250. In some embodiments, a reduction chamber 254 is disposed downstream of the main chamber 251. Preferably, the reduction chamber 254 is configured to funnel the foam solution exiting the main chamber 251 and direct the flow to the outlet 258. In some embodiments, the angle θ1 between an inner surface of the reduction chamber 254 and a base of the nozzle 250 is in a range of 40 degrees to 50 degrees, and preferably 45 degrees±1 degree. The diameter D7 at the inlet of the reduction chamber 254 can be the same as or less than the diameter D6 of the main chamber 251. For example, in some embodiments, the diameter D7 is less than the diameter D6 of the main chamber 251 and can be in a range of 0.650 in. (16.5 mm) to 0.750 in. (19 mm), and more preferably 0.680 in.±0.01 in. (17.3 mm±2.5 mm). In other embodiments, the diameter D7 can be in a range of 1.0 in. (25 mm) to 1.22 in. (31 mm), and more preferably 1.18 in.±0.01 in. (30 mm±0.25 mm). In some embodiments, the flow from the reduction chamber 254 is directed to the outlet 258 via an exit channel 256 disposed in the nozzle tip 257. The exit channel 256 can have a length L7 that is in a range of 0.5 in. (12.7 mm) to 1 in. (25 mm). In some embodiments, the length L7 can be 0.6 in.±0.1 in. (15.2 mm±2.5 mm) and other embodiments, the length L7 can be 0.75 in.±0.1 in. (19 mm±2.5 mm). Preferably, a diameter of the exit channel 256 is the same as the diameter of the outlet 258. In some embodiments, the nozzle 250 can include an intermediate chamber 252 disposed between the main chamber 251 and the reduction chamber 254. Prior to getting funneled by the reduction chamber 254, the intermediate chamber 252 can provide a transition region for the foam solution as the foam solution exits the insert 260 of the main chamber 251. Preferably, a diameter of the intermediate chamber 252 is the same as the diameter D7 of the inlet of the reduction chamber 254. In some embodiments, the interface between the main chamber 251 and the intermediate chamber 252 can include a land area 253 that is preferably formed by a difference in the diameter D6 of the main chamber 251 and the diameter D7 of the intermediate chamber 252. The land area 253 aligns and/or provides a backstop for the nozzle insert 260 (discussed below). Preferably, a length L8 of the intermediate chamber 252 is in a range of 0.06 in. (1.5 mm) to 0.10 in. (2.5 mm), and more preferably 0.08 in.±0.01 in. (2 mm±0.25 mm).

In some embodiments, the tip 257 of nozzle 250 is cone shaped. For example, in some embodiments, the surface of tip 257 forms an angle θ2 with respect to a base of the nozzle 250 that is in a range of 30 degrees to 60 degrees, and more preferably 40 degrees to 50 degrees, and even more preferably 45 degrees±1 degree. It is believed that the cone-shaped tip 257 aids the jet spray from each nozzle in drawing in the surrounding air. Thus, in contrast to some related art nozzles that have a flat tip, the nozzles 250 of the present disclosure are more efficient with respect to aspirating the air into the HEF generator 10.

Figure 9:
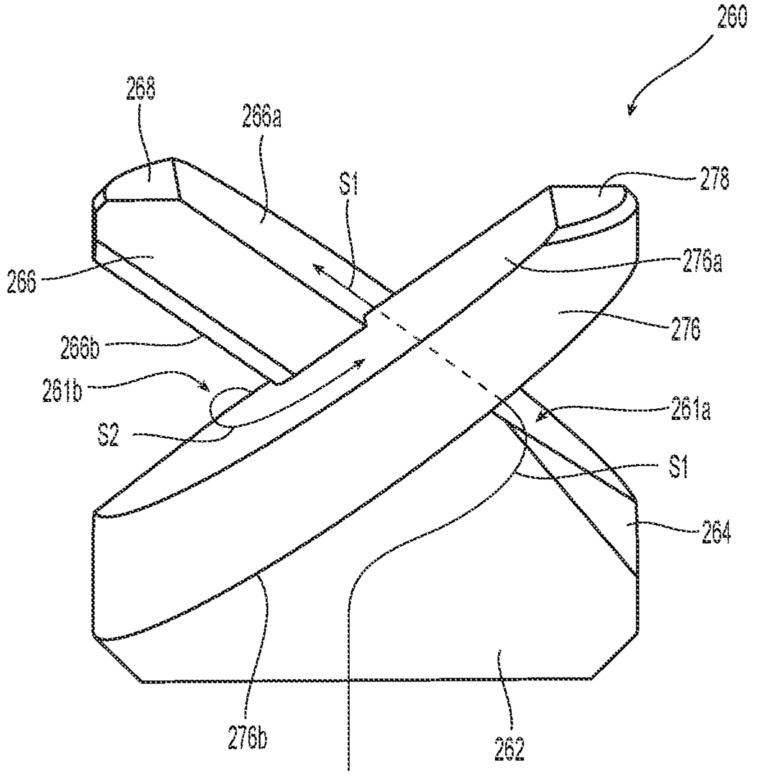
FIG. 9 is a perspective view of the nozzle insert of FIGS. 7 and 8.
Figure 10:
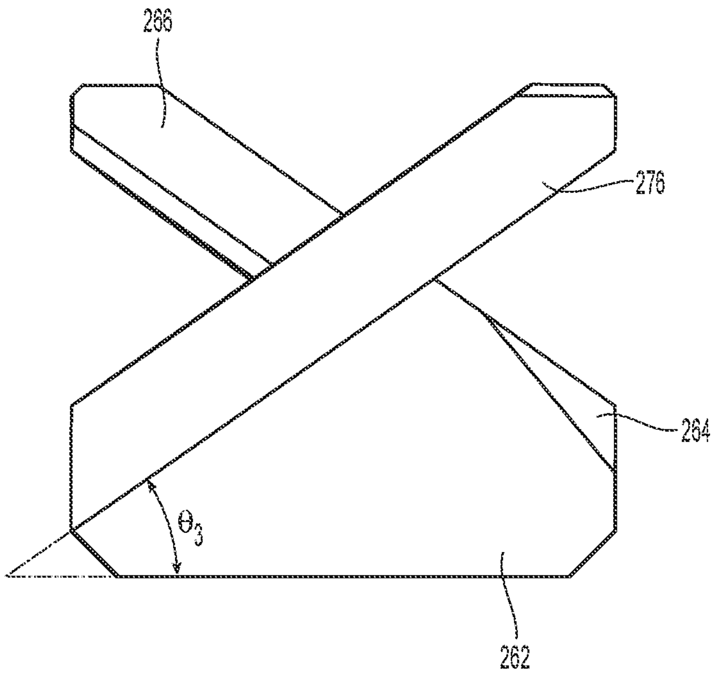
FIG. 10 is a side view of the nozzle insert of FIGS. 7-9.

FIGS. 9 and 10 are perspective and side views, respectively, of the nozzle insert 260. As seen in FIG. 7, the nozzle insert 260 is configured to fit into the main chamber 251. Preferably, in some embodiments, the nozzle insert 260 is positioned in the main chamber so as to make contact with the land 253. In some embodiments, a diameter of the nozzle insert 260 is approximately the same as the inner diameter of the main chamber 251. Preferably, the nozzle insert 260 is attached to the nozzle 250 by known means such as, for example, a press fit, solder, bonding, or other means to attach (e.g., fixedly or removably) the insert 260 to the nozzle 250.

In some embodiments, the nozzle insert 260 can have a configuration in which one or more twisting flow paths are created in order to enhance the exit velocity of the foam solution jet spray. For example, the nozzle insert 260 can include a swirl-type insert to create a swirl pattern on the foam solution jet spray that is exiting the nozzle 250. Preferably, all of the foam solution flowing through the nozzle 250 follows one or more curvilinear flow paths. In some embodiments, the nozzle insert 260 can have a multi-swirl vane configuration which splits the foam solution flow path into two or more curvilinear paths through the nozzle 250. In some prior art inserts, only a portion of the flow solution may follow a curvilinear path. That is, some prior art inserts can have slots or gaps that can allow a portion of the foam solution to pass through the nozzle along a substantially linear flow path while a portion follows a curvilinear path. It is believed that such an arrangement is less efficient with respect to aspirating the surrounding air as the foam solution exits the nozzle 250 and/or the foam expansion ratio of the generated foam.

In some embodiments, the nozzle insert 260 includes a dual swirl vane configuration with a flow divider 262 and swirl vanes 266 and 276. The nozzle insert 260 can be a single integrated unit or assembled from separate parts. For example, one or more of the swirl vane 266, the swirl vane 276, and/or the divider 262 can be a separate part that is attached (e.g., by soldering or other known means) to the insert assembly. Preferably, the swirl vanes 266 and 276 are angled and twisted with respect to a base of the nozzle 250 so as to provide a swirling motion as the foam solution flows through the nozzle 250. In some embodiments, the twist of each swirl vane 266, 276 extends approximate 180 degrees around the main chamber 251. However, in other embodiments, the twist of the swirl vanes can extend more than 180 degrees or less than 180 degrees. The slopes of the swirl vanes 266 and 276 are preferably opposite to each other so as to form an "X" shape when viewed from the side (e.g., see FIG. 10). As seen in FIG. 10, the slope of each swirl vane 266, 276 forms an angle θ3 that is in a range of 30 degrees to 50 degrees and, more preferably, 35 degrees to 45 degrees with respect to a base of the divider 262. Preferably, when inserted in the main chamber 251, the base of the divider 262 is perpendicular to the side walls of the main chamber. In some embodiments the angle θ3 can be 35 degrees±0.5 degree and, in some embodiments, the angle θ3 can be 40 degrees±0.5 degree.

In operation, as the foam solution enters the nozzle 250 through the nozzle inlet 248, the flow divider 262 splits the inlet flow into two streams (e.g., a first stream S1 and a second stream S2). As the first stream S1 flows up through the insert 260, the first stream S1 is bounded by the upstream surface 276*b* of vane 276 (see FIG. 9), a side of the flow divider 262, and the wall of the main chamber 251. As the first stream S1 continues on its path, the first stream S1 crosses over to the downstream surface 266*a* of vane 266 via crossover path 261*a*. Similarly, as the second stream S2 flows up through the insert 260, the second stream is bounded by the upstream surface 266*b* of vane 266, the other side of the flow divider 262, and the wall of the main chamber 251. As the second stream S2 continues on its path, the second stream S2 crosses over to the downstream surface 276*a* of vane 276 via crossover path 261*b* (see FIG. 9). As the first and second streams S1, S2 of the foam solution combine and exit the main chamber 251 on the downstream sides 266*a* and 276*a*, a swirl pattern is created on the foam solution flow. Preferably, in some embodiments, one or both of the downstream surfaces 266*a*, 276*a* of swirl vanes 266 and 277, respectively, are substantially planar so as to provide a solid surface for the foam solution flow. "Solid surface" means that the surfaces 266*a*, 276*a* do not have breaks, slots, gaps, holes, protrusions, indents, an aperture that allows a lineal flow path to be formed from the nozzle inlet to the nozzle outlet, and/or other features that can disturb the curvilinear flow path to a significant degree. In some embodiments, the interface between the flow divider 262 and/or the swirl vanes 266, 276 can be configured to provide a non-sharp transition at the crossover path (261*b*, 261*a*) for one or both flow streams as the respective stream transitions from the upstream side (266*b*, 276*b*) to the downstream side (276*a*, 266*a*). "Non-sharp transition" as used herein means a transition interface between two surfaces is not at a 90-degree angle. For example, in some embodiments, a non-sharp transition feature such as, for example, a chamfered edge, a rounded edge, and/or some other feature that provides a smooth transition can be included at the interface between the divider 262 and the respective swirl vane 266, 276. Thus, the crossover path 261*a*, 261*b* is preferably defined by the non-sharp transition feature to aid in smoothly transitioning (e.g., without excessive flow disturbances) the flow from the upstream side to the downstream side. For example, as seen in FIG. 9, the crossover path 261*a* of the insert 260 is defined by a chamfered edge 264 (e.g., at an angle of 45 deg.) between a side of the divider 262 and swirl vane 266. A similar chamfered edge between the other side of divider 262 swirl vane 276 can be provided to define crossover path 261*b* (not shown). In some embodiments, one or both swirl vanes 266, 276 can be configured to provide a smooth transition for the foam solution flow as the foam solution exits the main chamber 251. In some embodiments, one or both of the swirl vanes 266, 276 can have a transition feature such as, for example, a chamfered edge 268, 278, respectively, at the discharge end of the swirl vane 266, 276. The chamfered edge 268, 278 provides a flat surface for the nozzle insert 260 to seal against the land 253 of the nozzle body 255. In addition, the chamfered edge 268, 278 can aid in smoothly transitioning (e.g., without excessive flow disturbances) the foam solution flow from the main chamber 251 and into the reduction chamber 254.

In some exemplary embodiments, depending on the inlet pressure, the velocity of the foam solution at the outlet 258 of nozzle can be in a range of 248 in/min (630 cm/min) to 432 in/min (1007 cm/min) and the flow rate from each nozzle can be in a range of 16.5 gpm (62.5 lpm) to 30 gpm (113.6 lpm). Preferably, in some embodiments, the nozzle 250 includes a nozzle insert 260 that is configured to achieve desired flow characteristics for the foam solution as the foam solution impinges on the surface 122*a* and 124*a* of the foam generator portion 120. For example, the insert 260 can provide a flow pattern, velocity, and/or flow rate that achieves a desired foam expansion ratio. Exemplary embodiments of the nozzle 250 and/or the nozzle insert 260 described herein are not limited to aspirated-type foam generators and can be used in other applications such as, for example, other types of foam generators.

In some exemplary embodiments of the present disclosure, the nozzles 250 can have a K-factor in a range 0.4 to 3.2 $GPM/(psi)^{1/2}$. In some embodiments, the HEF generator 10 can include nozzles 250 having a K-factor in a range of 0.5 to 0.6 $GPM/(psi)^{1/2}$. For example, exemplary embodiments of the HEF generator 10 with nozzles in a range of 0.5 to 0.6 $GPM/(psi)^{1/2}$ K-factor can meet or exceed the expansion ratios of related art foam generators with nozzles in a range of 1.25 to 1.35 $GPM/(psi)^{1/2}$. By using lower K-factor nozzles, for the same number of nozzles, some exemplary embodiments of the HEF generator 10 can meet the performance of related art HEF foam generators while using less foam solution.

In some embodiments of the disclosure, nozzles having a preferred K-factor and/or preferred nozzle inserts can be used to reduce the number of nozzles in a foam generator while still maintaining predetermined foam expansion ratios. For example, some embodiments of the present disclosure, the HEF generator 120 can include nozzles 250 that have K-Factors in a range of 2.85 to 2.95 $GPM/(psi)^{1/2}$. In some known commercial foam generators, the nozzles can have K-factors in the range of 1.25 to 1.35 $GPM/(psi)^{1/2}$, which means that 6 to 9 nozzles are needed for these known commercial foam generators to generate foam in a range of 7800 to 11,200 CFM at approximately 101 psi (7 bar). In contrast, in embodiments of the present disclosure, the HEF generator 10 can have less than 6 nozzles, and more preferably 4 nozzles or less, and even more preferably 3 nozzles or less. In some embodiments, the HEF generator 10 can generate foam at a flow rate of about 10,000 CFM or more, and more preferably, 12,000 CFM or more, at about 101 psi, using less than 6 nozzles. For example, for a 4-nozzle configuration having K-factors in a range of 2.85 to 2.95 GPM/(psi)$^{1/2}$, the foam flow rate is about 9,970 CFM for an inlet pressure of 72 psi (5 bar) and about 12, 574 CFM for an inlet pressure of 101 psi (7 bar). In some exemplary embodiments, two or more HEF generators 10 can be attached to provide a generator system that provides a predetermined CFM that is greater than 12,500 CFM. For example, two HEF generators 10 that can each generate 12,500 CFM or more can be aligned and/or connected to each other to form a paired twin HEF generator unit that functions as a single HEF generator. The paired twin HEF generator unit can generate 25,000 CFM or more. In known commercial systems, a HEF generator unit capable of producing 25,000 CFM or more uses a forced-air type HEF generator having fans. In contrast, the paired twin HEF generator unit of the present disclosure, which generates foam at 25,000 CFM or more, does not use fans and thus is easier to install. Embodiments of the present disclosure are not limited to HEF generators that generate 10,000 CFM or more, and, in some embodiments, the HEF generator 10 can generate less than 10,000 CFM.

In addition to allowing foam generators to have fewer nozzles and being lighter, the high-efficiency nozzles allow the HEF generator 10 to have a larger inlet pressure range than related art aspirated-type foam generators. For example, in some embodiments, the HEF generator 10 can generate a foam expansion ratio of 400 or more for a nozzle inlet pressure (e.g., pressure in the nozzle manifold 220) at 40 psi (2.76 bar) or less, more preferably 29 psi (2.0 bar) or less, and even more preferably 21.8 psi (1.5 bar) or less. In some embodiments, the HEF generator 10 can generate a foam expansion ratio in a range of 800 to 1100, and more preferably 800 to 1000, for an inlet pressure of 116 psi (8 bar) or less, and more preferably 101 psi (7 bar) or less. In some embodiments, the HEF generator 10 is configured to operate at a nozzle inlet pressure (e.g., pressure in the nozzle manifold 220) that is in range of 21.8 psi (1.5 bar) to 116 psi (8 bar), and more preferably 29 psi (2 bar) to 101 psi (7 bar) while keeping the foam expansion ratio within a predetermined range. Preferably, the predetermined foam expansion ratio can be a ratio based on the foam solution concentrate being used. Preferably, in some embodiments, the predetermined expansion ratio can be in a range of 400 to 1100, preferably in a range of 400 to 1000, more preferably in a range of 400 to 900, and even more preferably in a range of 400 to 800. In some embodiments, the HEF generator 10 can generate foam at a volumetric foam flow rate of 1200 CFM or greater for inlet pressures that are 50 psi (3.44 bar) or less and more preferably 46 psi (3.17 bar) or less. In some embodiments, the HEF generator 10 can generate foam at a volumetric foam flow rate of 2000 CFM or greater for inlet pressures that are 75 psi (5.17 bar) or less, more preferably 40 psi (2.76 bar) or less, and even more preferably 29 psi (2 bar) or less. In some embodiments, the HEF generator 10 can generate foam at a volumetric foam flow rate of 2900 CFM or greater for inlet pressures that are 103 psi (7.1 bar) or less. In some embodiments, the HEF generator 10 can generate foam at a volumetric foam flow rate of 4000 CFM or greater for inlet pressures that are 40 psi (2.76 bar) or less and more preferably 29 psi (2 bar) or less. In some embodiments, the HEF generator 10 can generate foam at a volumetric foam flow rate of 9000 CFM or greater for inlet pressures that are 72.5 psi (5 bar) or less. In some embodiments, the HEF generator 10 can generate foam at a volumetric foam flow rate of 10,000 CFM or greater for an inlet pressure that is 101 psi (7 bar) or less. In some embodiments, the HEF generator 10 can generate foam at a volumetric foam flow rate of 12,500 CFM or greater for an inlet pressure that is 101 psi (7 bar) or less.

While the present invention has been disclosed with reference to certain embodiments, numerous modifications, alterations, and changes to the described embodiments are possible without departing from the sphere and scope of the present invention. Accordingly, it is intended that the present invention not be limited to the described embodiments, but that it has the full scope defined by the language of the following claims, and equivalents thereof.

What is claimed is:

1. A high-expansion foam generator comprising:

a nozzle manifold having at least one nozzle housing and at least one header to receive a foam solution;

at least one nozzle assembly attached to the nozzle manifold, each nozzle assembly having, a nozzle having an inlet to receive the foam solution from the nozzle manifold and an outlet configured to discharge the foam solution, and a nozzle insert disposed within the nozzle and attached to the nozzle in a stationary position; and a foam generator assembly disposed adjacent the nozzle manifold, the foam generator assembly including, a body portion having an inlet to receive the foam solution from the at least one nozzle assembly, a first foam generating portion having a tapered configuration, a base of the first foam generating portion being connected to an outlet of the body portion such that a portion of the foam solution exiting the body portion impinges on an interior surface of the first foam generating portion, and a second foam generating portion having a tapered configuration, a base of the second foam generating portion being connected to an apex of the first foam generating portion, and wherein the second foam generating portion protrudes into an interior of the first foam generating portion, wherein a ratio of a largest inlet dimension of the foam generator assembly to a length of the foam generator assembly is 0.50 or less, and wherein the at least one nozzle housing is configured to receive a respective nozzle assembly and is disposed on the at least one header such that a ratio of a diameter of an inlet of the respective nozzle to a distance from an inner wall surface of the at least one header to the inlet of the respective nozzle is 0.8 or less, wherein each nozzle insert includes a flow divider positioned in the nozzle at the inlet of the nozzle and swirl vanes between the flow divider and the outlet of the nozzle, the swirl vanes creating a swirl pattern in a flow of the foam solution, the flow divider and the swirl vanes splitting a flow path of the foam solution through the respective nozzle into two flow streams;

wherein the swirl vanes comprise a first swirl vane on one side of the flow divider, the first swirl vane having a first upstream solid surface and a first downstream solid surface, and a second swirl vane on another side of the flow divider, the second swirl vane having a second upstream solid surface and second downstream solid surface, wherein the first downstream solid surface crossovers the flow divider and connects with the second upstream solid surface, wherein the second downstream solid surface crossovers the flow divider and connects with the first upstream solid surface, wherein the flow divider transitions with a first non-sharp transition member to the first upstream solid surface, wherein the flow divider transitions with a second non-sharp transition member to the second upstream solid surface.

2. The generator of claim 1, wherein the at least one nozzle assembly includes less than six nozzle assemblies.

3. The generator of claim 1, wherein the at least one header includes at least one main header that receives the foam solution from an external source and at least one sub-header that is connected to the at least one main header, the at least one sub-header configured to receive the foam solution from the at least one main header, wherein the at least one nozzle housing comprises a plurality of nozzle housings and each of the at least one main header has one or more nozzle housings of the plurality of nozzle housings disposed thereon and each of the at least one sub-header has one or more nozzle housings of the plurality of nozzle housings disposed thereon, wherein the at least one main header and the at least one sub-header have linear configurations and the at least one sub-header is disposed orthogonal to the at least one main header, and wherein at least one of the at least one main header or the at least sub-header has a closed end along a centerline of the respective header.

4. The generator of claim 1, wherein a tip of each nozzle is cone shaped such that a surface of the tip of the nozzle forms an angle with respect to a base of the nozzle, the angle being in a range of 30 degrees to 60 degrees.

5. The generator of claim 1, wherein the diameter of the inlet of the respective nozzle is in a range of 0.5 in. to 1.5 in.

6. The generator of claim 5, wherein the distance from the inner wall surface of the at least one header to the inlet of the respective nozzle is in a range of 3.5 in. to 4.5 in.

7. The generator of claim 1, wherein one or more of the following provides a means for generating foam at a spray inlet pressure of 40 psi or less:

the at least one nozzle assembly including less than six nozzle assemblies, the at least one header including at least one main header that receives the foam solution from an external source and at least one sub-header that is connected to the at least one main header, the at least one sub-header configured to receive the foam solution from the at least one main header, the at least one main header and the at least one sub-header having linear configurations and the at least one sub-header being disposed orthogonal to the at least one main header, a tip of each nozzle having a cone shape, the nozzle insert including the swirl vanes, or the ratio of the diameter of the inlet of the respective nozzle to the distance from the inner wall surface of the at least one header to the inlet of the respective nozzle.

8. A foam generator comprising:

a nozzle manifold having at least one nozzle housing and at least one header to receive a foam solution;

at least one nozzle assembly attached to the nozzle manifold, each nozzle assembly having, a nozzle to discharge the foam solution, and a nozzle insert disposed within the nozzle and attached to the nozzle in a stationary position; and a foam generator assembly disposed adjacent the nozzle manifold, the foam generator assembly to receive the foam solution and aspirated air to generate foam, the foam generator assembly including a first foam generator portion and a second foam generator portion disposed in an interior of the first foam generator portion, wherein each nozzle insert includes a flow divider and intersecting swirl vanes for creating a swirl pattern in a flow of the foam solution, the flow divider and the swirl vanes forming a flow path for the foam solution through the respective nozzle into at least two flow paths that have solid surfaces, wherein each flow path includes a crossover path that transitions a surface of the flow divider and a downstream surface of a swirl vane to an upstream surface of another swirl vane, wherein the crossover path includes a non-sharp transition member, wherein a base of the flow divider is disposed upstream of the crossover path in a flow direction of the foam solution, and wherein the downstream surface of each swirl vane crosses the surface of the flow divider and contacts the upstream surface of the another swirl vane.

9. The generator of claim 8, wherein the at least one nozzle assembly receives a respective nozzle and is disposed on the at least one header such that a ratio of a diameter of an inlet of the respective nozzle to a distance from an inner wall surface of the at least one header to the inlet of the respective nozzle is 0.8 or less.

10. The generator of claim 8, wherein a number of the swirl vanes in each nozzle insert is two.

11. The generator of claim 8, wherein the non-sharp transition member includes one of a chamfered edge or a rounded edge.

12. The generator of claim 11, wherein the non-sharp transition member includes the rounded edge.

13. The generator of claim 11, wherein the non-sharp transition member includes the chamfered edge.

14. The generator of claim 8, wherein the at least one nozzle assembly includes less than six nozzle assemblies.

15. The generator of claim 8, wherein the at least one nozzle assembly includes four nozzle assemblies or less.

16. The generator of claim 8, wherein the at least one header includes at least one main header that receives the foam solution from an external source and at least one sub-header that is connected to the at least one main header, the at least one sub-header configured to receive the foam solution from the at least one main header, wherein the at least one nozzle housing comprises a plurality of nozzle housings and each of the at least one main header has one or more nozzle housings of the plurality of nozzle housings disposed thereon and each of the at least one sub-header has one or more nozzle housings of the plurality of nozzle housings disposed thereon, wherein the at least one main header and the at least one sub-header have linear configurations and the at least one sub-header is disposed orthogonal to the at least one main header, and wherein at least one of the at least one main header or the at least sub-header has a closed end.

17. The generator of claim 8, wherein a tip of each nozzle is cone shaped.

18. The generator of claim 17, wherein a surface of the tip of the respective nozzle forms an angle with respect to a base of the nozzle, the angle being in a range of 30 degrees to 60 degrees.

19. The generator of claim 18, wherein the angle is in a range of 40 degrees to 50 degrees.

20. The generator of claim 8, wherein a diameter of an inlet of the respective nozzle is in a range of 0.5 in. to 1.5 in.

21. The generator of claim 8, wherein a distance from an inner wall surface of the at least one header to an inlet of the respective nozzle is in a range of 3.5 in. to 4.5 in.

22. The generator of claim 8, wherein the foam generator assembly further includes a body portion having an inlet to receive the foam solution from the at least one nozzle assembly, wherein the first foam generator portion has a tapered configuration, a base of the first foam generator portion being connected to an outlet of the body portion such that a portion of the foam solution exiting the body portion impinges on an interior surface of the first foam generator portion, and wherein the second foam generator portion has a tapered configuration, a base of the second foam generator portion being connected to an apex of the first foam generator portion, and wherein the second foam generator portion protrudes into an interior of the first foam generator portion.

23. The generator of claim 8, wherein the at least one header includes at least one main header that receives the foam solution from an external source and at least one sub-header that is connected to the at least one main header, the at least one sub-header receives the foam solution from the at least one main header, and wherein the at least one main header and the at least one sub-header have linear configurations and the at least one sub-header is disposed orthogonal to the at least one main header.

24. The generator of claim 23, wherein the at least one sub-header includes two sub-headers disposed colinear to each other and orthogonal to a main header of the at least one main header to form a plus shape.

25. The generator of claim 8, wherein a ratio between a gap between an outlet of each nozzle and an inlet to the foam generator assembly and a length of the foam generator assembly is 0.125 or greater.

26. The generator of claim 8, wherein a length of the foam generator assembly is in a range of 72 in. to 85 in.

27. The generator of claim 8, wherein each nozzle includes one or more internal chambers including a main chamber for receiving the respective nozzle insert and a reduction chamber disposed downstream on the main chamber, the reduction chamber configured to funnel and direct the foam solution to an outlet of the respective nozzle, and wherein an angle between an inner surface of the reduction chamber and a base of the respective nozzle is in a range of 40 degrees to 50 degrees.

28. The generator of claim 27, wherein each nozzle includes an intermediate chamber between the main chamber and the reduction chamber, and wherein each nozzle includes a land area between the main chamber and the intermediate chamber, the land area being formed by a difference in a diameter of the main chamber and a diameter of the intermediate chamber.

29. The generator of claim 8, wherein each nozzle housing is configured such that the foam solution enters a laminar flow region prior to entering the respective nozzle.

30. The generator of claim 8, wherein a largest inlet dimension of the foam generator assembly is an inlet diameter that is in a range of 35 in. to 37 in.

31. The generator of claim 8, wherein one or more of the following provides a means for generating foam at a spray inlet pressure of 40 psi or less:

the at least one nozzle assembly including less than six nozzle assemblies, the at least one header including at least one main header that receives the foam solution from an external source and at least one sub-header that is connected to the at least one main header, the at least one sub-header configured to receive the foam solution from the at least one main header, the at least one main header and the at least one sub-header having linear configurations and the at least one sub-header being disposed orthogonal to the at least one main header, a tip of each nozzle having a cone shape, the nozzle insert including the swirl vanes, or the at least one nozzle housing receiving a respective nozzle and being disposed on the at least one header such that a ratio of a diameter of an inlet of the respective nozzle to a distance from an inner wall surface of the at least one header to the inlet of the respective nozzle is 0.8 or less.

32. The generator of claim 8, wherein a ratio of a largest inlet dimension of the foam generator assembly to a length of the foam generator assembly is 0.50 or less.

33. The generator of claim 8, wherein an entirety of the downstream surface of each swirl vane is solid.

* * * * *